(12) United States Patent
Gupta

(10) Patent No.: US 10,872,177 B2
(45) Date of Patent: Dec. 22, 2020

(54) EMBEDDED SECURITY ELEMENTS FOR DIGITAL MODELS USED IN ADDITIVE MANUFACTURING

(71) Applicant: NEW YORK UNIVERSITY, New York, NY (US)

(72) Inventor: Nikhil Gupta, Ossining, NY (US)

(73) Assignee: NEW YORK UNIVERSITY, New York, NY (US)

(*) Notice: Subject to any disclaimer, the term of this patent is extended or adjusted under 35 U.S.C. 154(b) by 363 days.

(21) Appl. No.: 15/710,723

(22) Filed: Sep. 20, 2017

(65) Prior Publication Data

US 2018/0081997 A1 Mar. 22, 2018

Related U.S. Application Data

(60) Provisional application No. 62/397,560, filed on Sep. 21, 2016.

(51) Int. Cl.
*G06F 30/00* (2020.01)
*B33Y 50/00* (2015.01)
(Continued)

(52) U.S. Cl.
CPC ............ *G06F 30/00* (2020.01); *B29C 64/386* (2017.08); *B33Y 50/00* (2014.12); *B33Y 80/00* (2014.12);
(Continued)

(58) Field of Classification Search
CPC ..... G06F 17/50; G06F 2217/12; B33Y 50/00; B33Y 80/00; B29C 64/386; H04N 1/00838; Y02P 90/265
(Continued)

(56) References Cited

U.S. PATENT DOCUMENTS 5,705,117 A * 1/1998 O'Connor ............... B29C 41/20
  264/401
6,021,358 A * 2/2000 Sachs ............... G05B 19/40937
  700/98
(Continued)

OTHER PUBLICATIONS

Wikipedia—Exploded View article, retrieved Dec. 21, 2019, however being used to teach concept was known after about 1450 AD; https://en.wikipedia.org/wiki/Exploded-view_drawing (Year: 2019).*
(Continued)

*Primary Examiner* — Justin C Mikowski
(74) *Attorney, Agent, or Firm* — Foley & Lardner LLP

(57) ABSTRACT

A method for securing a computer-aided design (CAD)-based shape to prevent shape counterfeiting by unauthorized three-dimensional (3D) printing includes creating and embedding a security element in the CAD-based shape itself. In some embodiments, the method includes splitting (slicing) a first solid of a three-dimensional 3D model into at least two parts, such that the 3D model comprises at least two distinct solids. The shape of the distinct solid(s) may be specified by a plurality of curved surfaces, which are defined by performing a finite element analysis on the CAD-based shape to determine an optimal shape for each curved surface. The method further includes converting the 3D model to a digital surface geometry schema according to a first resolution. The digital surface geometry schema describes the surface geometry of the at least two distinct solids. The first resolution is part of the security controls of the CAD-based shape. The first resolution may be selected based on a shape of the split of the first solid, a location of the split of the first solid, a 3D printer type, an anticipated horizontal print direction, an anticipated vertical print direction, an anticipated slicer software scheme, an anticipated slice thickness, and/or an anticipated slice location.

19 Claims, 45 Drawing Sheets

(51) Int. Cl.
B29C 64/386 (2017.01)
H04N 1/00 (2006.01)
B33Y 80/00 (2015.01)
G06F 119/18 (2020.01)

(52) U.S. Cl.
CPC ..... *H04N 1/00838* (2013.01); *G06F 2119/18* (2020.01); *Y02P 90/02* (2015.11)

(58) Field of Classification Search
USPC .......................................................... 703/1
See application file for complete search history.

(56) References Cited

U.S. PATENT DOCUMENTS

| | | | | |
|---|---|---|---|---|
| 6,556,199 | B1* | 4/2003 | Fang | G06T 15/005 345/424 |
| 2009/0174709 | A1* | 7/2009 | Kozlak | G06F 17/50 345/420 |
| 2011/0087350 | A1* | 4/2011 | Fogel | G06F 17/50 700/98 |
| 2012/0183701 | A1* | 7/2012 | Pilz | B22F 3/1055 427/504 |
| 2012/0224755 | A1* | 9/2012 | Wu | G06T 17/00 382/131 |
| 2013/0139990 | A1* | 6/2013 | Appleby | B22C 9/22 164/47 |
| 2014/0267116 | A1* | 9/2014 | Weiner | A61F 5/05866 345/173 |
| 2014/0322103 | A1* | 10/2014 | McDevitt | B01L 3/5025 422/554 |
| 2015/0269289 | A1* | 9/2015 | Kim | G06F 17/5009 703/6 |
| 2017/0100893 | A1* | 4/2017 | Meisner | B33Y 10/00 |
| 2017/0214821 | A1* | 7/2017 | Morovic | H04N 1/32309 |

OTHER PUBLICATIONS

Jonathan D. Hiller and Hod Lipson, STL 2.0: A Proposal for a Universal Multi-Material Additive Manufacturing File Format, Mechanical and Aerospace Engineering, Cornell University, Ithaca NY 14853, USA, accepted Sep. 15, 2009, pp. 266-278. (Year: 2009).*
Al Faruque, et al., "Acoustic side-channel attacks on additive manufacturing systems," ICCPS '16 Proceedings of the 7th International Conference on Cyber-Physical Systems, 10 pages (2016).
Al Faruque, et al., "Forensics of Thermal Side-Channel in Additive Manufacturing Systems," Center for Embedded and Cyber-Physical Systems, Technical Report #16-01, 17 pages (2016).
Asadi-Eydivand, et al., "Effect of technical parameters on porous structure and strength of 3D printed calcium sulfate prototypes," Robotics and Computer-Integrated Manufacturing 37, pp. 57-67 (2016).
Atzeni & Salmi, "Economics of additive manufacturing for end-usable metal parts," The International Journal of Advanced Manufacturing Technology 622(9-12), pp. 1147-1155 (2012).
Baufeld, et al., "Additive manufacturing of Ti-6Al-4V components by shaped metal deposition: Microstructure and mechanical properties," Materials & Design 31(Supp. 1), pp. S106-S111 (2010).
Bertol, et al., "Medical design: Direct metal laser sintering of Ti-6Al-4V," Materials & Design 31(8), pp. 3982-3988 (2010).
Bradshaw, et al., "The intellectual property implications of low-cost 3D printing," Scripted 7(1), pp. 5-31 (2010).
Buchbinder, et al., "High Power Selective Laser Melting (HP SLM) of Aluminum Parts," Physics Procedia 12(A), pp. 271-278 (2011).
Calignano, "Design optimization of supports for overhanging structures in aluminum and titanium alloys by selective laser melting," Materials & Design 64, pp. 203-213 (2014).
Campbell, et al., "Additive manufacturing: rapid prototyping comes of age," Rapid Prototyping Journal 18(4), pp. 255-258 (2012).
Chhetri, et al., "KCAD: kinetic cyber-attack detection method for cyber-physical additive manufacturing systems," ICCAD '16 Proceedings of the 35th International Conference on Computer-Aided Design, 8 pages (2016).
Chu, et al., "Design for Additive Manufacturing of Cellular Structures," Computer-Aided Design and Applications 5(5), pp. 686-696 (2013).
Cohen, et al., "Mandibular reconstruction using stereolithographic 3-dimensional printing modeling technology," Oral Surgery, Oral Medicine, Oral Pathology, Oral Radiology, and Endodontology 108(5), pp. 661-666 (2009).
Cooper, et al., "Design and manufacture of high performance hollow engine valves by Additive Layer Manufacturing," Materials & Design 69, pp. 44-55 (2015).
De Lima & Sankare, "Microstructure and mechanical behavior of laser additive manufactured AISI 316 stainless steel stringers," Materials & Design 55, pp. 526-532 (2014).
Farzadi, et al., "Effect of Layer Thickness and Printing Orientation on Mechanical Properties and Dimensional Accuracy of 3D Printed Porous Samples for Bone Tissue Engineering," PLOS ONE 9(9), e108252, 14 pages (2014).
Ford, "Additive Manufacturing Technology: Potential Implications for U.S. Manufacturing Competitiveness," Journal of International Commerce & Economics 6(1), pp. 40-74 (2014).
Garg, et al., "Quantifying the financial impact of IT security breaches," Information Management & Computer Security 11(2), pp. 74-83 (2003).
Gaynor, et al., "Multiple-Material Topology Optimization of Compliant Mechanisms Created Via PolyJet Three-Dimensional Printing," Journal of Manufacturing Science and Engineering 136(6), 061015, 10 pages (2014).
Gupta, et al., "ObfusCADe: Obfuscating Additive Manufacturing Cad Models Against Counterfeiting: Invited," DAC '17 Proceedings of the 54th Annual Design Automation Conference, 6 pages (2017).
Hague, et al., "Implications on design of rapid manufacturing," Proceedings of the Institution of Mechanical Engineers, Part C: Journal of Mechanical Engineering Science 217(1), pp. 25-30 (2003).
Hopkinson & Dicknes, "Analysis of rapid manufacturing—using layer manufacturing processes for production," Proceedings of the Institution of Mechanical Engineers Part C: Journal of Mechanical Engineering Science 217(1), pp. 31-39 (2003).
Huang, et al., "Additive Manufacturing: Current State, Future Potential, Gaps and Needs, and Recommendations," Journal of Manufacturing Science and Engineering 137(1), 014001, 10 pages (2015).
Ivanova, et al., "Unclonable security features for additive manufacturing," Additive Manufacturing 1-4, pp. 24-31 (2014).
Jardini, et al., "Customised titanium implant fabricated in additive manufacturing for craniomaxillofacial surgery," Virtual and Physical Prototyping 9(2), pp. 115-125 (2014).
Kassner, "AutoCAD malware: Rare but malignant," TechRepublic, retrieved from https://www.techrepublic.com/blog/it-security/autocad-malware-rare-but-malignant/, posted Dec. 5, 2013, 3 pages.
Kilari & Sridaran, "A Survey on Security Threats for Cloud Computing," International Journal of Engineering Research & Technology 1(7), 10 pages. (2012).
Kinsella, "Additive Manufacturing of Superalloys for Aerospace Applications," Air Force Research Laboratory, ADA489302, 7 pages. (2008).
Kruth, et al., "Progress in Additive Manufacturing and Rapid Prototyping," CIRP Annals 47(2), pp. 525-540 (1998).
Lethaus, et al., "Additive manufacturing for microvascular reconstruction of the mandible in 20 patients," Journal of Cranio-Maxillofacial Surgery 40(1), pp. 43-46 (2012).
Levy, et al., "Rapid Manufacturing and Rapid Tooling With Layer Manufacturing (LM) Technologies, State of the Art and Future Perspectives," CIRP Annals 52(2), pp. 589-609 (2003).
Melchels, et al., "Additive manufacturing of tissues and organs," Progress in Polymer Science 37(8), pp. 1079-1104 (2012).

(56) References Cited

OTHER PUBLICATIONS

Moore & Williams, "Fatigue characterization of 3D printed elastomer material," Twenty-Third Annual International Solid Freeform Fabrication Symposium, pp. 641-655 (2012).

Morrow, et al., "Environmental aspects of laser-based and conventional tool and die manufacturing," Journal of Cleaner Production 15(10), pp. 932-943 (2007).

O'Neal, "Australia's Gold Coast: Loaded 3D Printed Gun Found in Raid of Sophisticated Meth Lab," 3DPrint.com, retrieved from https://3dprint.com/110370/gold-coast-3d-printed-gun-raid/, posted Dec. 10, 2015, 3 pages.

Perlroth, "Yahoo says hackers stole data on 500 million users in 2014," The New York Times, retrieved from https://www.nytimes.com/2016/09/23/technology/yahoo-hackers.html, posted Sep. 22, 2016, 3 pages.

Peterson, "The Sony Pictures hack, explained," The Washington Post, retrieved from https://www.washingtonpost.com/news/the-switch/wp/2014/12/18/the-sony-pictures-hack-explained/?noredirect=on&utm_term=.d1312fcfa8a6, posted Dec. 18, 2014, 4 pages.

Ponche, et al., "A novel methodology of design for Additive Manufacturing applied to Additive Laser Manufacturing process," Robotics and Computer-Integrated Manufacturing 30(4), pp. 389-398 (2014).

Ruffo, et al., "Cost estimation for rapid manufacturing—laser sintering production for low to medium volumes," Proceedings of the Institution of Mechanical Engineers Part B: Journal of Engineering Manufacture 220(9), pp. 1417-1427 (2006).

Sachlos & Czernuszka, "Making Tissue Engineering Scaffolds Work. Review on the Application of Solid Freeform Fabrication Technology to the Production of Tissue Engineering Scaffolds," European Cells and Materials 5, pp. 29-40 (2003).

Sachs, et al., "Three-Dimensional Printing: Rapid Tooling and Prototypes Directly from a CAD Model," CIRP Annals 39(1), pp. 201-204 (1990).

Scott, et al., "Additive Manufacturing: Status and Opportunities," IDA Science and Technology Policy Institute, 35 pages. (2012).

Singare, et al., "Design and fabrication of custom mandible titanium tray based on rapid prototyping," Medical Engineering & Physics 26(8), pp. 671-676 (2004).

Sturm, et al., "Cyber-physical vulnerabilities in additive manufacturing systems," Twenty-Fifth Annual International Solid Freeform Fabrication Symposium, pp. 951-963 (2014).

Szilvsi-Nagy & Matyasi, "Analysis of STL files," Mathematical and Computer Modeling 38(7-9), pp. 945-960 (2003).

Tata, et al., "Efficient slicing for layered manufacturing," Rapid Prototyping Journal 4(4), pp. 151-167 (1998).

Yampolskiy, et al., "Security Challenges of Additive Manufacturing with Metals and Alloys," International Conference on Critical Infrastructure Protection: Critical Infrastructure Protection IX, pp. 169-183 (2015).

Yampolskiy, et al., "Using 3D printers as weapons," International Journal of Critical Infrastructure Protection 14, pp. 58-71 (2016).

Yan, et al., "Advanced lightweight 316L stainless steel cellular lattice structures fabricated via selective laser melting," Materials & Design 55, pp. 533-541 (2014).

Zeltmann, et al., "Manufacturing and Security Challenges in 3D Printing," JOM 68(7), pp. 1872-1881 (2016).

\* cited by examiner

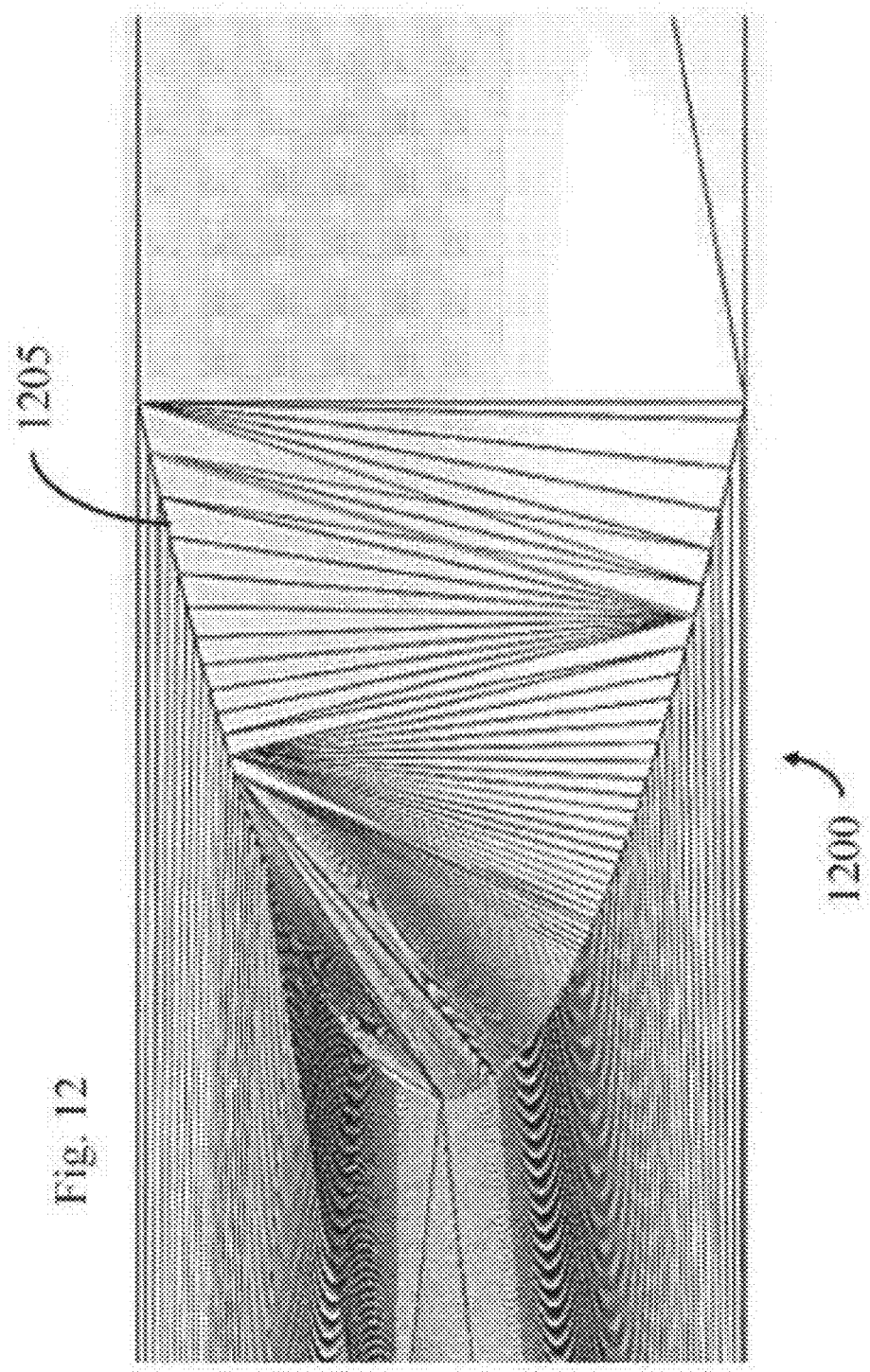

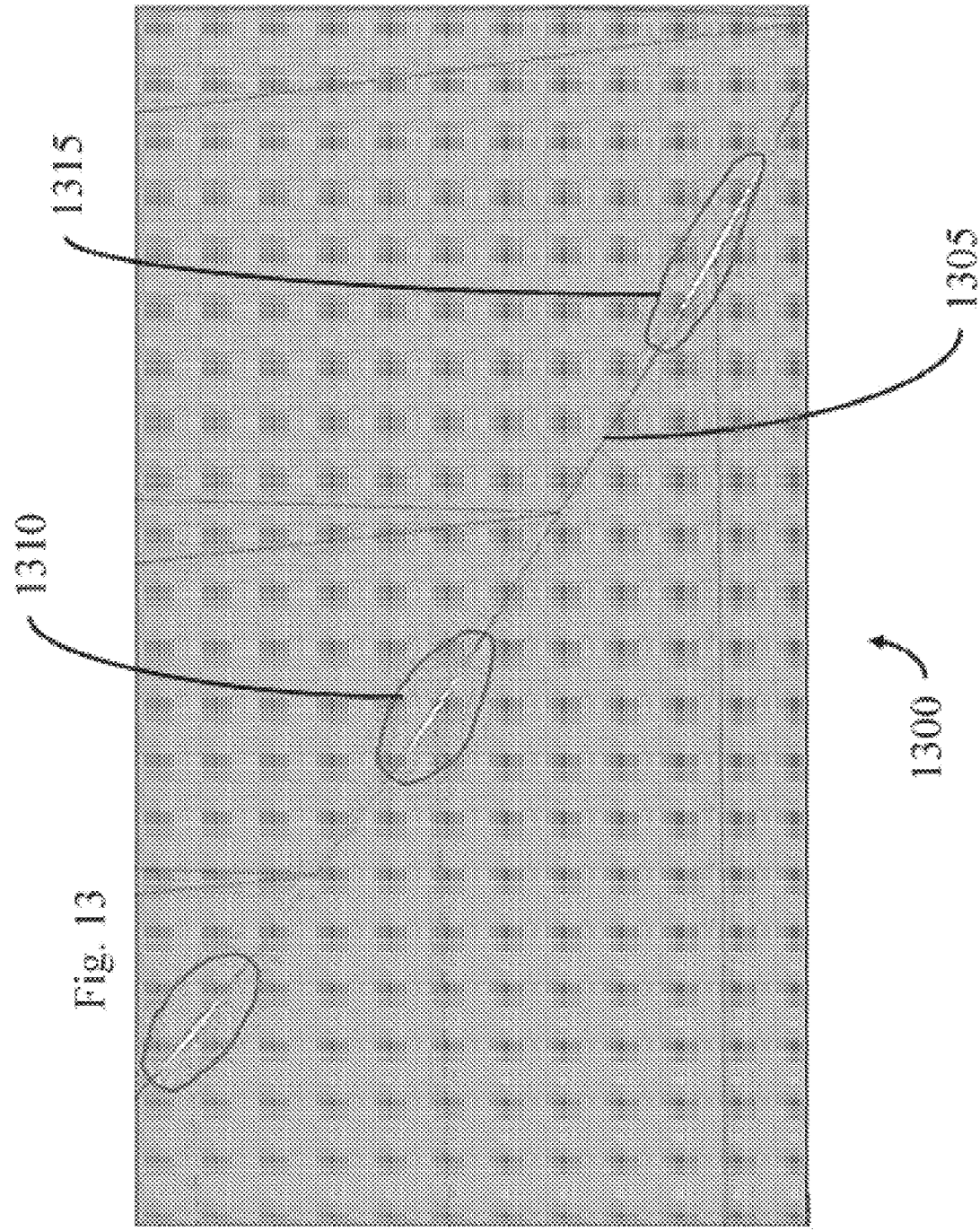

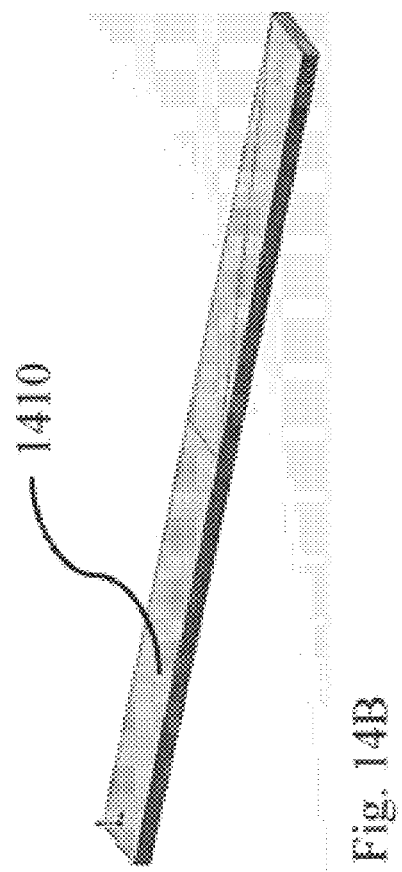

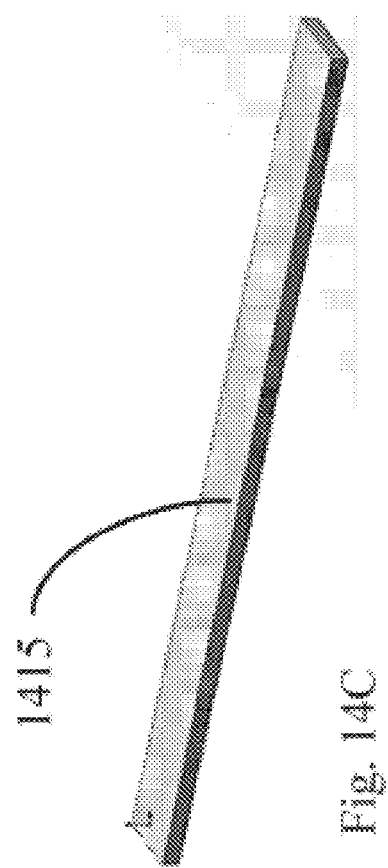

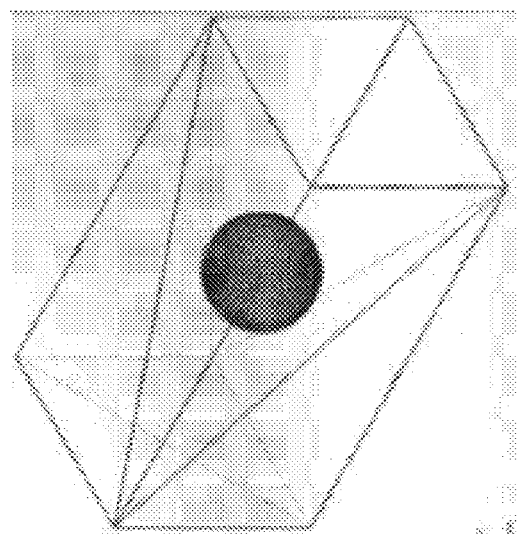

EMBEDDED SECURITY ELEMENTS FOR DIGITAL MODELS USED IN ADDITIVE MANUFACTURING

CROSS-REFERENCE TO RELATED PATENT APPLICATIONS

This application claims priority to U.S. Provisional Patent Application No. 62/397,560, entitled "UTILIZING COMPUTER AIDED DESIGN FEATURES FOR SECURITY IN ADDITIVE MANUFACTURING," filed on Sep. 21, 2016, which is herein incorporated by reference in its entirety.

STATEMENT OF GOVERNMENT INTEREST

The United States Government claims certain rights in this invention pursuant to Office of Naval Research Contract No. N00014-10-1-0988.

TECHNICAL FIELD

The present disclosure relates generally to data security. In particular, the present disclosure relates to embedded security elements for digital models used in additive manufacturing.

BACKGROUND

Additive manufacturing, such as three-dimensional (3D) printing, includes methods and processes for synthesizing a 3D object. For example, successive layers of material can be deposited under computer control to form the 3D object. Objects created using additive manufacturing methods may be of any shape or geometry. Such objects may be produced from data representing an object, such as digital 3D model data, an Additive Manufacturing File (AMF), or any other type of suitable data.

One example of an additive manufacturing method includes depositing a binder material onto a powder bed with inkjet printer heads layer by layer. After the deposits are complete, the solid object may be separated from the powder bed. Other types of additive manufacturing may include binder jetting, directed energy deposition, material extrusion, material jetting, powder bed fusion, sheet lamination, and vat photopolymerization.

SUMMARY

Embodiments described herein relate generally to embedded security elements for digital models used in additive manufacturing. The systems and methods include controlling fault tolerances using resolution and other parameters, 3D model slicing, geometric features such as spline splitting and two or three-dimensional surfaces, controlled separation of geometric bodies with distance, and/or surface-level security controls. In an example embodiment, a method comprises digitally splitting a first solid of a three-dimensional (3D) model into at least two parts such that the 3D model comprises at least two distinct solids. The method further comprises converting the 3D model to a digital surface geometry schema according to a first resolution, wherein the digital surface geometry schema describes surface geometry of the at least two distinct solids. In some embodiments, the digital surface geometry schema is a stereolithography (STL) model type. In some embodiments, the digital surface geometry schema comprises at least one triangulated surface. In some embodiments, the digital surface geometry schema is submitted to a cloud server device for storage. According to various embodiments, the splitting of the first solid is along a straight plane and/or a curved plane.

The method may further comprise selecting a location and a shape of the splitting of the first solid based at least in part on a parameter selected from the group consisting of: the first resolution, a 3D printer type, an anticipated horizontal print direction, an anticipated vertical print direction, an anticipated slicer software scheme, an anticipated slice thickness, and an anticipated slice location. In some embodiments, the method may further comprise selecting the first resolution from a plurality of available resolutions based at least in part on a parameter selected from the group consisting of: a shape of the split of the first solid, a location of the split of the first solid, a 3D printer type, an anticipated horizontal print direction, an anticipated vertical print direction, an anticipated slicer software scheme, an anticipated slice thickness, and an anticipated slice location.

In some embodiment, the method further comprises importing the digital surface geometry schema and knitting surfaces of the at least two distinct solids together to form a second solid that approximates the first solid prior to the first solid being split into at least two parts. After knitting the surfaces of the at least two distinct solids together, there are no gaps in between the surfaces corresponding to where the first solid was split. In other embodiments, after knitting the surfaces of the at least two distinct solids together, there is at least one gap in the surfaces corresponding to at least part of where the first solid was split.

The method may further comprise specifying a 3D printer for printing and the printing conditions of the second solid such that the at least one gap does not substantially affect the quality of the printing of the second solid. In some embodiments, the method further comprises deleting, after importing the digital surface geometry schema, a plurality of surface geometry sections that are in the same plane and inserting, before knitting the surfaces of the at least two distinct solids together, a planar surface to replace the deleted plurality of surface geometry sections. In some embodiments, the method further comprises displacing the two parts after splitting the first solid. In some embodiments, the method further comprises moving, after importing the digital surface geometry schema and before knitting the surfaces of the at least two distinct solids together, the two parts to remove the displacement between the two parts. The the displacement may be located where the first solid was split.

Another example embodiment relates to a method, comprising embedding a shape in a first solid of a three-dimensional (3D) model to yield a second solid; converting the 3D model to a digital surface geometry schema according to a first resolution, wherein the digital surface geometry schema describes surface geometry of the second solid including the embedded shape; and importing the digital surface geometry schema. In some embodiments, the method further comprises printing the second solid. In some embodiments, the shape represents a security element embedded into the 3D model.

Another example embodiment relates to a method, comprising determining an optimal dimension for the curved surface; adjusting a dimension of the curved surface to account for a change in geometry of the curved surface; and converting the 3D model to a digital surface geometry schema, wherein the curved surface is converted to a plurality of flat surfaces, and wherein, because of the adjustment of the dimension of the curved surface, each of the plurality of flat surfaces comports with the optimal dimension. In some embodiments, the method further comprises identifying the plurality of flat surfaces that represent that collectively define the curved surface before the 3D model was converted to the digital surface geometry schema. In some embodiments, the method further comprises converting the plurality of flat surfaces back into the curved surface prior to the dimension of the curved surface being adjusted. In some embodiments, the re-scaling accounts for the adjustment of the dimension of the curved surface and the conversion of the curved surface into the plurality of flat surfaces.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF THE DRAWINGS

The foregoing and other elements of the present disclosure will become more fully apparent from the following description and appended claims, taken in conjunction with the accompanying drawings. Understanding that these drawings depict only several implementations in accordance with the disclosure and are therefore not to be considered limiting of its scope, the disclosure will be described with additional specificity and detail through use of the accompanying drawings.

FIG. 12 is another close-up view of a rectangular 3D model split with a curved spline split element according to a high-resolution digital surface geometry schema.

FIG. 13 is a close-up view of gaps that form from a spline split element according to a digital surface geometry schema.

FIGS. 14A-14C show steps for removing a plurality of surface geometry sections, replacing them with a planar surface, and knitting the remaining surface geometry sections together.

FIGS. 30A and 30B show a surface geometry model and a specimen 3D-printed cross section, respectively, of a different 3D model with an embedded surface sphere.

Figure 1:
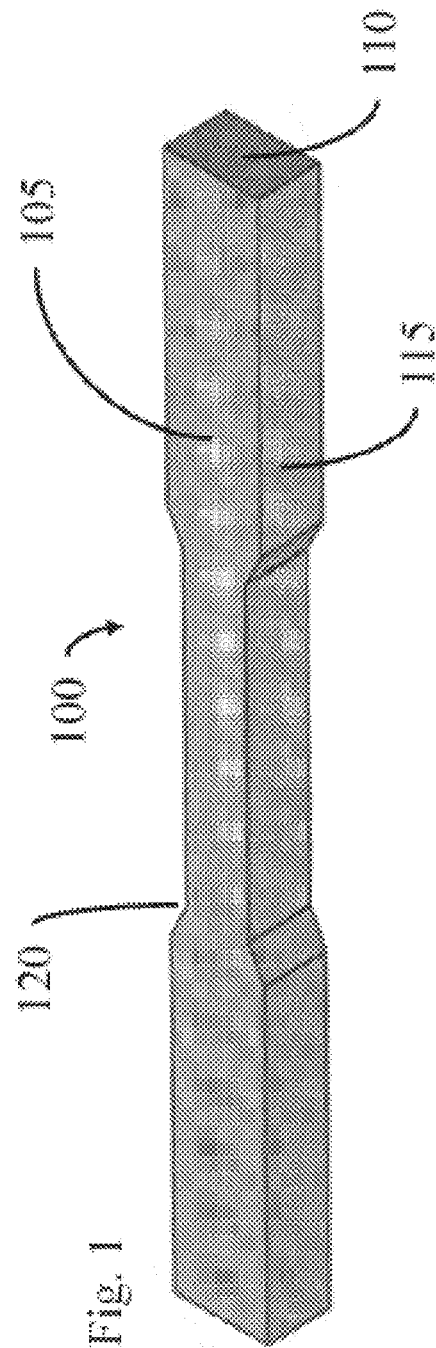
FIG. 1 is a perspective view of a computer-aided design (CAD) three-dimensional (3D) model.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION

Embodiments described herein relate generally to embedding security elements into three-dimensional (3D) models such that attempts to print specimens based on the 3D models without knowledge of the security elements would yield defective or lower quality specimens. Systems and methods for embedded security control include controlling fault tolerances using resolution and other parameters, 3D model slicing, geometric features such as spline splitting and two or three-dimensional surfaces, controlled separation of geometric bodies with distance, and/or surface-level security controls.

The additive manufacturing (AM) market is a fast growing sector in R&D and industrial manufacturing in many countries, and the trend is expected to continue in the future. Although additive manufacturing refers to a wide range of manufacturing methods, the term "three-dimensional (3D) printing" is used herein as a synonym for additive manufacturing.

Many advanced materials have been developed and applied in AM, such as functionally-graded materials, composite materials, and bio-materials. Multi-material printers have been developed to achieve necessary functionality, performance, weight, and cost. When printing with a multi jet system, interactions at interfaces of adhesive bonding between materials are studied to avoid premature fatigue failure while providing tunable performance and enhanced functionality in multi-material additive manufacturing. For example, in the design of compliant mechanisms, improvement of the maximum deflection and fatigue failure at the structure's joint-like sections can be achieved by having up to nine gradient material blends created using a combination of two different materials in various ratios. Similar issues can be addressed for printed composite materials as well. Among metallic materials, titanium alloys are known to be difficult to manufacture by traditional methods due to their high strength, low thermal conductivity, and chemical reactivity with tool materials at elevated temperatures. However, using the layer-by-layer deposition principle in additive manufacturing, near-net shape parts of titanium can become economically feasible.

The additive manufacturing chain often relies heavily on cloud computing resources to develop, store, retrieve, organize, etc. 3D models. The use of computing resources with additive manufacturing is sometimes referred to as digital manufacturing. In some instances, cloud computing is used to support digital manufacturing. 3D printers are often connected to the Internet and/or cloud computing resources to help queue jobs and/or remotely diagnose problems. The connectivity of every step between a creator computing device, a 3D printer, and cloud computing/storage resources can expose an entire manufacturing chain to the danger of sabotage from external or internal actors. Since 3D-printed parts are often complex, contain internal elements that are not visible, and may take as long as 24 hours (or longer) to print, systems and methods for securing the entire chain of 3D printing and design are highly desirable.

Cybersecurity tools such as password protection, encryption, and firewalls can be deployed at various steps of the digital manufacturing process, but instances of network compromise, even for some of the largest corporations using the best cybersecurity tools, are numerous and continue to increase despite the use of latest technology. Accordingly, disclosed herein are systems, methods, and computer-readable media for embedding security elements into a computer model that can be either printed accurately or not printed accurately on specific 3D printers. In an example embodiment, an original CAD model is obfuscated by introducing special elements that prevent high-quality manufacturing of the 3D geometry specified by the CAD model unless certain conditions for printing and processing of the CAD model are met. Specifically, when these special conditions are not met, the manufactured artifact will be defective because the presence of embedded elements in the final part printed using the original CAD model reduces the quality and performance of the part.

In this way, when an unauthorized actor obtains a 3D model, if the actor does not know the correct settings relating to an embedded security element, then he/she would not be able to print the same part in high quality. In other words, embedding security elements in a solid model or models for security purposes can provide a new layer of protection against part counterfeiting and theft. Examples of such elements are provided herein throughout.

In some embodiments, the special security elements are based at least on certain parameters associated with the curvature and internal surfaces of a split original CAD model. According to various embodiments, the resulting component will print in high quality only if a specific set of conditions is met. These conditions include the resolution of the stereolithography (STL) model, slicing conditions, orientation on the print bed and/or printer settings.

The additive manufacturing (AM) supply chain is sometimes referred to as cloud-based or digital manufacturing. Often, the entire product design, development and optimization process relies on software tools, many of which are accessed and/or located online. Even onsite technical software often relies on access to license manager servers through the internet. Finite element analysis often utilizes access to computer clusters or supercomputers over a network such as the internet, depending on the product size and analysis type. Many 3D printers are also connected to the internet for such purposes as remote access for queuing printing jobs, diagnosis of problems, and troubleshooting. Each of these steps and factors present vulnerabilities and security challenges. Increasing instances of network hacking, compromise, or unauthorized use targeting major corporations and/or government agencies have become an important threat to the cyber-physical manufacturing chain of AM. Network security is often the main line of defense in digital manufacturing AM. However, once the network is compromised, additional security elements may be required to protect digital assets.

When computer-aided design (CAD) models prepared for AM are stolen or compromised, the hacker can manufacture a component specified by the CAD model using 3D printers. Detection of counterfeit product can be especially challenging in the AM supply chain because a stolen CAD model can be printed using the same type of 3D printer to provide a product of the same quality as the original product. Quality of workmanship or product may not even be an issue in such cases as long as a hacker has access to high quality printers. Rapid increase in 3D printing quality and proliferation allows for increased manufacture and delivery of 3D-printed products, for example on a contract basis, making fighting counterfeiting challenging as a hacker could contract out manufacturing of a stolen 3D model without needing to use a 3D printer. In such a case, the systems and methods as disclosed herein for securing models are highly advantageous.

Accordingly, methods and systems are disclosed for security of the AM supply chain and can act as another line of defense, for example, where network security might be breached. The systems and methods herein are related to embedding security elements into CAD models by product creators. Such elements may print in the form of defects if the model is not 3D-printed exactly under the intended conditions anticipated by the product creator. Several such elements are identified herein that can be implemented in CAD models with the aim of creating a final product of a desired geometry and properties only under the right printing conditions, and provide defective part under other printing conditions. The way these methods work is different from using passwords, watermarks, electronic signatures and other security methods. Advantageously, these methods include design elements in the CAD model itself.

In the embodiments of the present disclosure, Solid-Works™ 2015 is used for solid modeling. The CAD models are 3D-printed using a fused deposition modeling (FDM) based Stratasys Dimension Elite 3D printer. This printer can print a model material (e.g., acrylonitrile butadiene styrene or ABS) and a dissolvable support material (e.g., SR-10™/P400SR™ Soluble Support Material-acrylic copolymer). CatalystEX™ slicing software is used for preparing the sliced model and generating the encoder file containing toolpath information to be sent to the 3D printer. Table 1A shows the options selected during the slicing step.

TABLE 1A

Settings used in CatalystEX ™ slicing program for generating 3D print jobs.

| Property | Value |
| --- | --- |
| Layer resolution (cm) | 0.01778 |
| Model interior | Solid |
| Support fill (mode) | Smart |
| STL units | Millimeters |
| Extrusion temperature (° C.) | 220 |
| Build platform temperature (° C.) | 80 |

Layer resolution refers to thickness of each layer during the deposition process. The finer layer thickness of 0.178 mm is selected to obtain higher precision in the model. Model interior options include "solid", "sparse—high density", and "sparse—low density". The "solid" option is chosen to illustrate the embodiments of the present disclosure.

As given in Table 1B, different x/y and z resolution may result in different implementations of the same CAD element depending on printing orientation. To understand the effect of different printing orientations, the STL models are placed and sliced in two orientations, x-y and x-z, in CatalystEX™ and then printed accordingly.

TABLE 1B

Specifications for Stratasys Dimension Elite, Mojo FDM 3D printers and Objet30 Pro material jetting resin printer.

| Printer specification | Layer thickness resolution (cm)) | (Z X/Y resolution (CM) | Minimum element size (CM) |
| --- | --- | --- | --- |
| Stratasys Dimension Elite | 00.0254 or 0.01778 | N/A | N/A |
| Stratasys Mojo | 0.01778 | 0.049784 | 0.1016 |
| Objet30 Pro | 0.0016 | N/A | 0.01 |

I. System(s) and Method(s) for Embedded Security Control by Controlling Fault Tolerances Using Resolution and Other Parameters To transmit a design from CAD for 3D printing, a stereolithography (STL) model can be used as an intermediary model format. Other model types may also be used instead of or in addition to STL. These model types include OBJ, AMF, 3MF, PLY, X3D, etc. The STL file is a type of digital surface geometry schema, such a solid is represented as a collection of its two dimensional surfaces rather than as a solid 3D object as in CAD. When an STL file is used to 3D print, the 3D printer or a computing device associated with the 3D printer can infer the solid shape of an object based on the surface geometry stored in the STL file. A CAD program can be configured to convert any type of 3D model to the STL file format or a similar format. For example, engineers can model their designs in a CAD program, such as Solid-Works™ and then convert it to an STL file type.

According to various embodiments and as described below in reference to FIGS. 1-8, converting a CAD model to the STL format with a specified resolution known only to authorized users of the CAD model may be used as a security element for creating precision fit parts in the case the CAD model is stolen or otherwise compromised.

FIG. 1 is a perspective view of a computer-aided design (CAD) three-dimensional (3D) model 100. Example components associated with the CAD 3D model 100 are shown. As shown, the CAD 3D model 100 of the example embodiment of FIG. 1 includes a front face 105, a side face 115, an end face 110, and at least one curved surface 120. The CAD 3D model 100 can be converted to an STL file or another suitable digital surface geometry schema as described, for example, with reference to FIG. 2.

Figure 2:
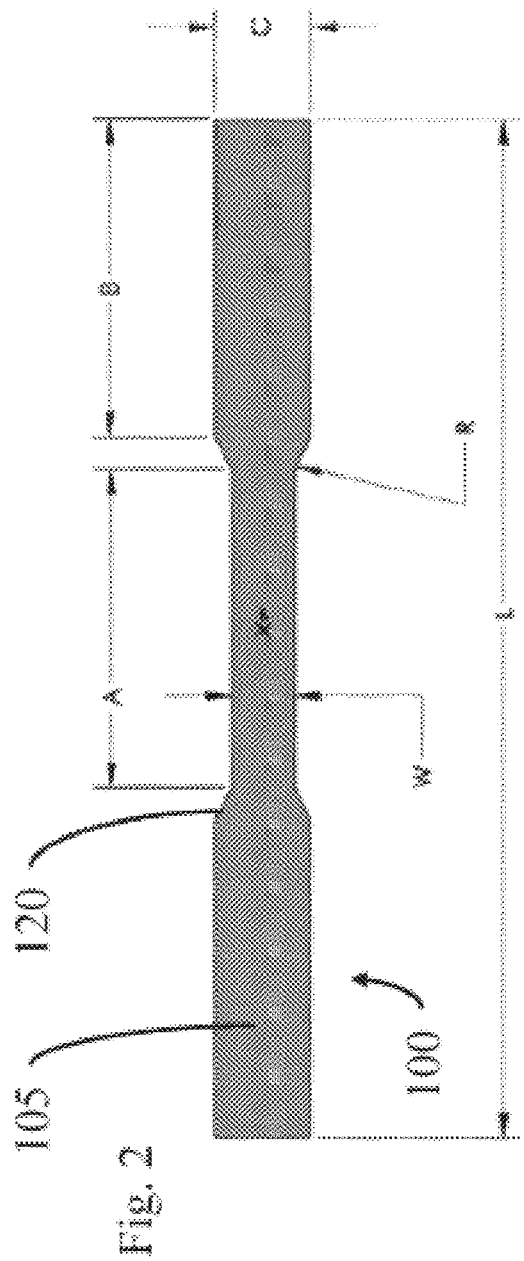
FIG. 2 is a front face view of a CAD 3D model.

FIG. 2 is a front face view of the CAD 3D model 100, and shows the front face 105 and the curved surface 120. Example dimensions of the CAD 3D model 100 are shown below in Table 1C.

TABLE 1C

Specifications of the tensile test specimen geometry.

| Specification of specimen | Dimension (inches) |
| --- | --- |
| W (width) | 0.25 |
| R (radius of fillet, min.) | 0.25 |
| L (overall length) | 4 |
| A (length of reduced section) | 1.25 |
| B (length of grip section) | 1.25 |
| C (width of grip section) | 0.375 |
| T (thickness) | 0.25 |

The mass of the CAD 3D model 100 can be measured before and after the conversion to an STL file, and the change of mass can therefore be quantified. A significant change in the mass value may represent the degree to which the STL shape, which is comprised of flat surfaces approximating the modeled 3D object, is different from the original CAD 3D model 100, with a smaller delta value being desirable. The density of the part represented by the CAD 3D model 100 may further determine the mass value. According to various embodiments, the density may be input by a user or assumed by the CAD program for calculating the mass of the 3D model.

The part file of the CAD 3D model 100 can be converted to a digital surface geometry schema, such as an STL file, and any changes in the mass of the specimen can be measured. When saving to the STL file, the option of refinement/resolution used can be varied and set as desired. For example, the CAD software may have preset options like "coarse", "fine", "custom" (user-defined), etc. In the example embodiments, the SolidWorks™ software was used. The resolution in CAD files was defined as a set of two parameters, namely, "coarse": deviation of 0.16495722 mm and the angle of 30 deg; "fine:" deviation of 0.0635615 mm and the angle of 10 deg; and "custom:" deviation of 0.00687322 mm and the angle of 0.5 deg. STL files and other surface geometry specifications may also be stored in different formats (e.g., binary). In the embodiment of FIG. 2, a "coarse" resolution and binary file type are selected. For example, the STL file stored according to a coarse resolution specifies a surface area of 4.854 in$^2$.

A resulting STL file may comprise a variety of shapes representing the surface of the CAD 3D model 100, and the STL file will include the parameters specifying the orientation and/or placement of those shapes. A common shape used for STL files is at least one triangle. In the embodiment of FIG. 2, the resulting STL file for the CAD 3D model 100 has a total of 60 triangles. During the conversion process to an STL file, the CAD program is configured to take the model and arrange the triangles so as to convert every face of the shape in CAD 3D model 100 into planar faces.

A change between the original CAD 3D model and the model after being converted to an STL file was an increase in surface area as compared between the STL file and the original part file.

Figure 3:
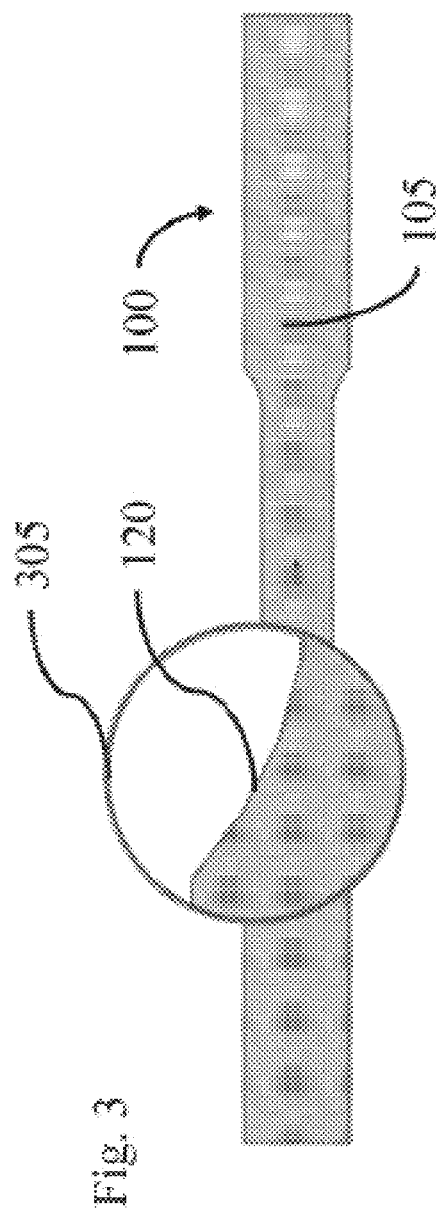
FIG. 3 is a front face view of a CAD 3D model with a zoomed view.

FIG. 3 is the front face 105 view of the CAD 3D model 100 with a zoomed view 305 zooming in on the the curved surface 120, in its original CAD model (i.e., before the object was converted to an STL file).

Figure 4:
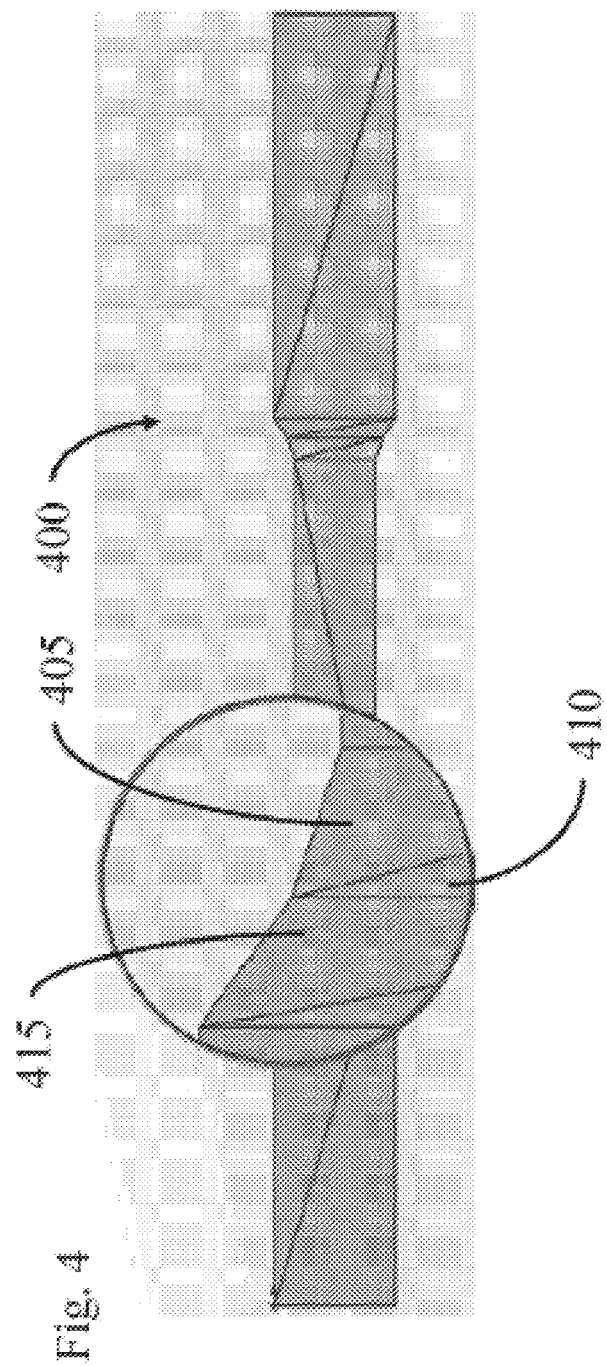
FIG. 4 is a front face view of a 3D model with a zoomed view of a digital surface geometry schema.

FIG. 4 is a front face view of a 3D model 400 with a zoomed view of a digital surface geometry schema. The 3D model 400 may represent the CAD 3D model 100 discussed above. In other words, the 3D model 400 shows the surface geometry of the CAD 3D model 100 such that the surface geometry is approximated as a collection of various surface geometry shapes included in the STL file or in another suitable digital surface geometry schema. As shown, the CAD 3D model 100 has been divided into a plurality (at least two) of planar shapes (as shown, faces and steps) after being converted to an STL schema. Thus, the curved surface 120 is now approximated using various triangles, including, for example, triangles 405, 410, and 415.

Once the 3D model 400 has been converted to an STL file, any curved surface in the 3D model 400 is converted to a planar surface. After the 3D model 400 has been saved to a STL file, it is not ordinarily possible to derive the original curved geometry directly from the STL file. When converting from the original 3D model 400 to an STL file, the curves on the model are converted to a set of straight lines and the change in mass properties occurs. Once the model is converted, if the STL file is converted back to the 3D part model, the 3D model still retains all faces being straight and planar. Such a loss in geometry could cause problems when 3D printing or using a 3D-printed object, and, therefore, resolution levels that allow for the proper tolerances and geometries of the desired 3D-printed object should be selected when creating the STL file or another suitable digital surface geometry schema.

In the context of the present disclosure, the conversion process from a 3D model 400 to an STL file was tested for a total of five cycles to see if there were any further increase and/or changes in the mass properties. Specifically, after saving the original 3D model 400 to an STL file, the STL file was saved back as a SolidWorks™ part model and that was considered to be one cycle. After each cycle, any changes to the mass properties of the 3D model 400 were noted. After the initial conversion to the STL file, there were no further changes to the mass during the cycle testing. During the cycle test, it was also noted that the triangle sizes of the digital surface geometry schemas across the cycles remained the same.

In a similar test, the original specimen 3D model 400 was once again converted to an STL file but this time, the refinement type (or resolution) of the STL file was set to "fine." The total number of triangles was noted to be 92, an increase from the "coarse" setting, where the number of triangles was 60. Advantageously, a less noticeable change in mass was seen compared to the original part model, as shown in Table 2 below. This test also was also carried out for a total of five cycles and there was no further change after each subsequent cycle of test.

TABLE 2

Comparison of the mass between the STL and original models of the specimen. The percentage deviation from the original values is also noted.

| Mass Property | Original | Coarse STL | Fine STL |
|---|---|---|---|
| Mass (lb) | 0.01196171 | 0.01197023 (+0.07%) | 0.01196385 (+0.02%) |
| Volume (in$^3$) | 0.33109913 | 0.33133499 (+0.07%) | 0.33115828 (+0.02%) |
| Surface Area (in$^2$) | 4.85293409 | 4.85434788 (+0.07%) | 4.85328894 (+0.02%) |

As shown, in the "coarse" STL file, the specimen increased an overall 0.07 percent in its mass. In the "fine" STL file, the specimen increased an overall 0.02 percent.

If the CAD 3D model has any curved elements in it, the curve will be replaced by a series of steps when the CAD model is converted to an STL file, slightly changing the dimensions and subsequently the volume, mass, and surface area of the object. The resolution of the STL file can be adjusted/customized between or beyond the "coarse" and "fine" resolutions to change the amount of planar face steps that describe the originally curved surfaces. The "fine" resolution creates more steps, or planar faces, and the shape is more closely related in geometry to the original curved surface than that generated using the "coarse" resolution.

Figure 5:
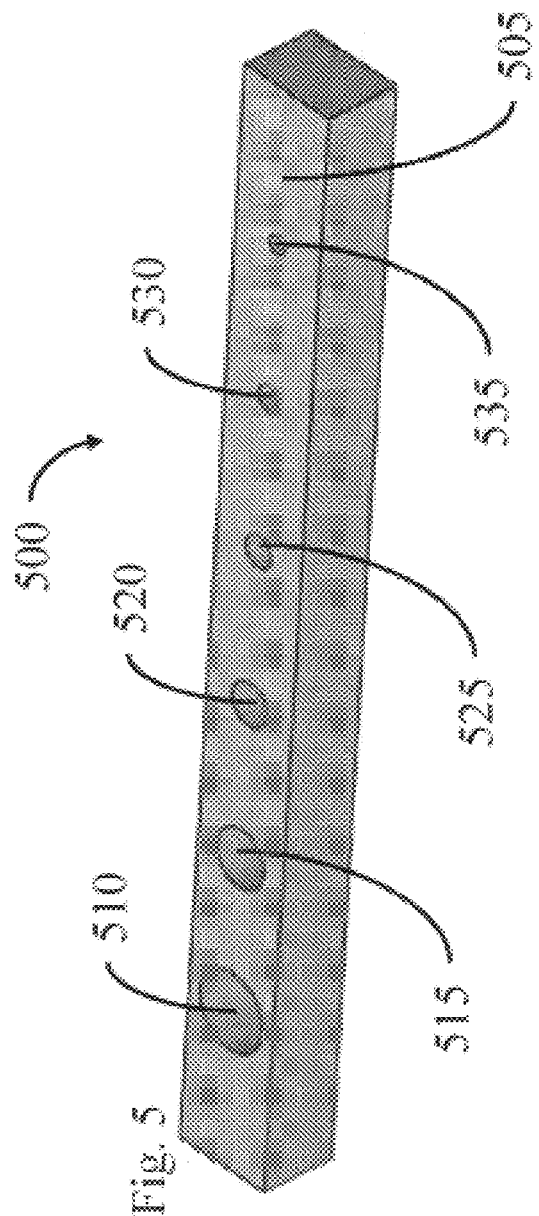
FIG. 5 is a perspective view of another CAD 3D model with a series of holes.

FIG. 5 is a perspective view of another CAD 3D model 500 having a series of holes 510, 515, 520, 525, 530, and 535 in a top face 505 of the CAD 3D model 500. In this example, a specimen (CAD 3D model 500) with different size holes was tested to see the deviation in the hole size when the CAD 3D model 500 is converted to an STL file at different resolutions. The dimensions of the specimen are 4 in by 0.375 in. On this specimen, six holes are equally spaced on the top face 505 of the plate. The width of the first hole is 75% of the plate's width, and the width of each next hole is 75% of the previous hole's width. Table 3 below indicates the original CAD model hole sizes.

TABLE 3

Hole diameter listed from left to right; original specimen model

| Hole 510: | 0.28125 in |
|---|---|
| Hole 515: | 0.2109375 in |
| Hole 520: | 0.15820313 in |
| Hole 525: | 0.11865234 in |
| Hole 530: | 0.08898926 in |
| Hole 535: | 0.06674194 in |

From the original CAD 3D model 500, an STL file was created using the "coarse" resolution, which resulted in a total of 564 triangles. In the STL file, the rectangular plate's overall dimension remained the same. The circular edges of the holes were now all filled in with straight edges in the STL file, as shown in FIG. 6 and discussed below.

Figure 6:
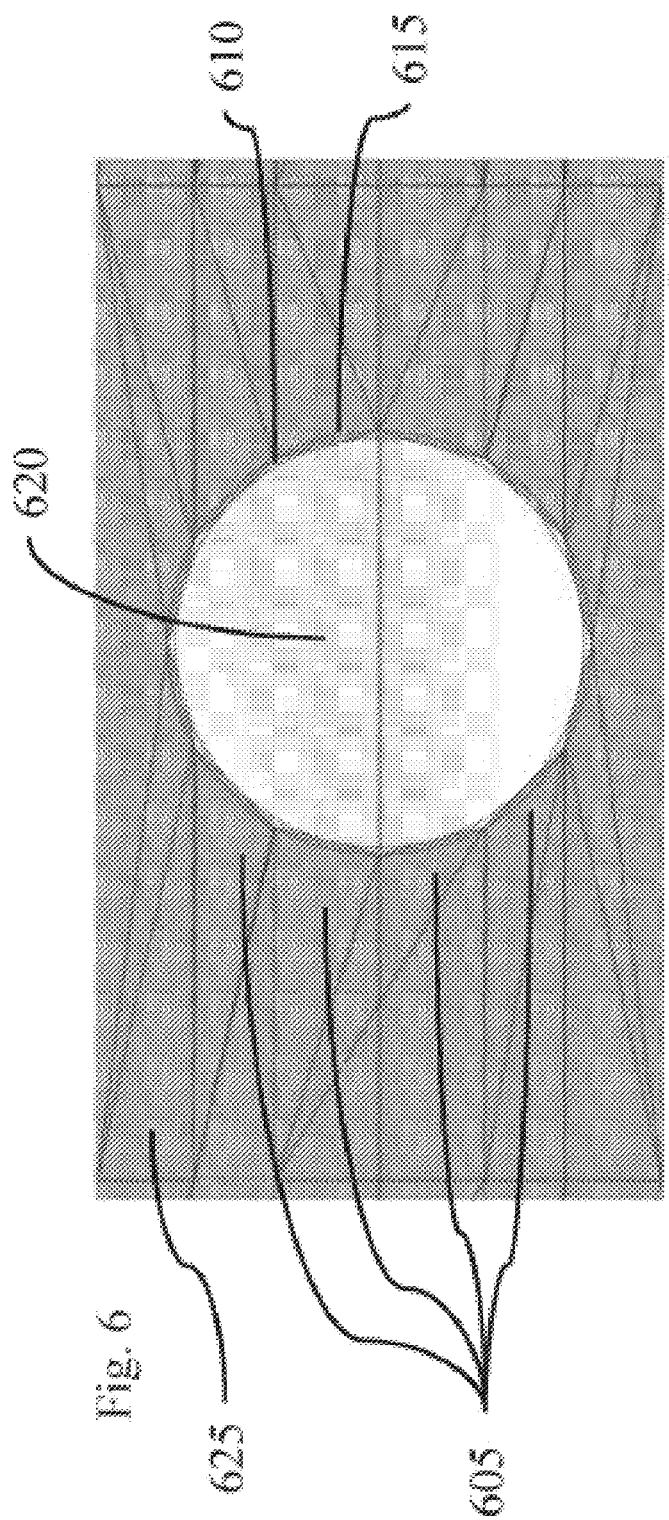
FIG. 6 is a top view of a portion of the 3D model with a series of holes according to a digital surface geometry schema.

FIG. 6 is a top view of a portion of the 3D model with a series of holes according to an example digital surface geometry schema, such as an STL file. FIG. 6 includes a hole 620 in a top face 625, surface geometry triangles 605, an inner circle 610 of the hole 620, and an outer circle 615 of the hole 620. FIG. 6 shows what one of the holes 510, 515, 520, 525, 530, or 535 look like after the CAD 3D model 500 is converted to an STL file. To determine the diameter of the smallest circle that can fit in the hole, the circle 610 was made tangent to the edges of each the straight edge holes in the STL file. The diameter of the circle 610 was measured and the result for the coarse STL schema is shown in Table 4 below:

TABLE 4

Resulting hole diameters after conversion to the coarse STL schema.

| Hole 510 | 0.27167 in |
|---|---|
| | (−3.41%) |
| Hole 515: | 0.20375 in |
| | (−3.41%) |
| Hole 520: | 0.15281 in |
| | (−3.41%) |
| Hole 525: | 0.11461 in |
| | (−3.40%) |
| Hole 530: | 0.08596 in |
| | (−3.40%) |
| Hole 535: | 0.06447 in |
| | (−3.40%) |

Figure 7:
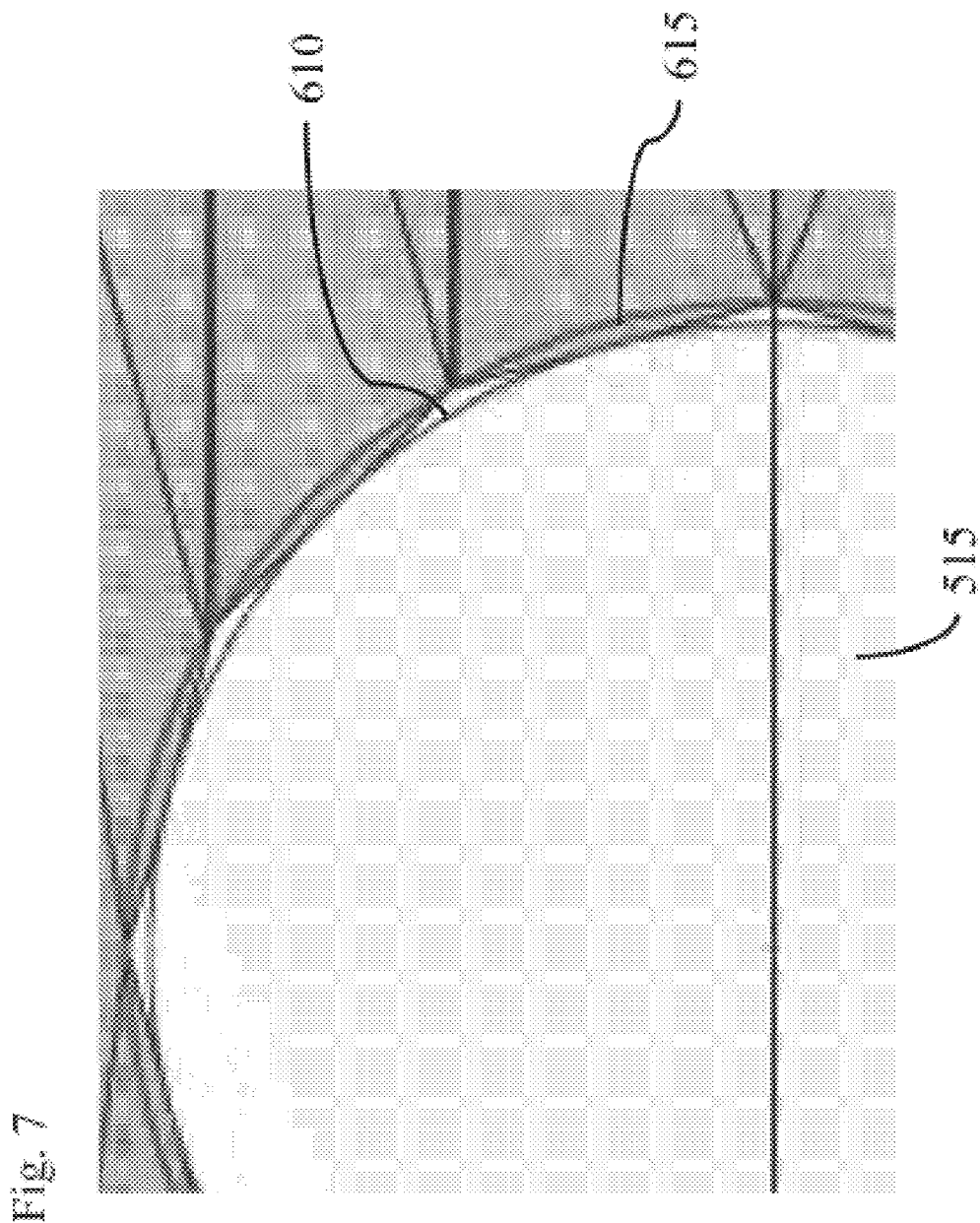
FIG. 7 is another top view of the portion of the 3D model with a series of holes according to a digital surface geometry schema.

FIG. 7 is another top view of the portion of the 3D model with a series of holes according to an example digital surface geometry schema, such as an STL file. FIG. 7 shows in detail the circles 610 an 615 of FIG. 6. When saving the specimen to a STL file using the "coarse" resolution, there was a 3.41% decrease in the diameter of the holes as per the inscribed circle as shown in Table 4 above. In various applications, if the intent is to fit a bolt into the hole, the decrease in the hole size will not allow a proper fit and should therefore be accounted for. To accomplish this, the original model was then converted to an STL file using the option of the "fine" resolution. The "fine" STL file comprised a total of 1140 triangles in the surface geometry. The hole sizes of the STL file is listed in Table 5 below. There was a 0.38% decrease in the hole diameter compared to the original measurement. Such observations are important in designing parts with precision fit, and similar reductions in size may occur around curved sections.

TABLE 5

Resulting hole diameter after conversion to the fine STL file.

| Hole 510: | 0.28018 in |
|---|---|
| | (−0.38%) |
| Hole 515: | 0.21013 in |
| | (−0.38%) |
| Hole 520: | 0.15760 in |
| | (−0.38%) |
| Hole 525: | 0.11820 in |
| | (−0.38%) |
| Hole 530: | 0.08865 in |
| | (−0.38%) |
| Hole 535: | 0.06649 in |
| | (−0.38%) |

A circle 610 was drawn to be fitted inside the straight edges and an outside circle 615 was drawn to be fitted outside of the hole element in the STL file shown in FIGS. 6 and 7. The diameter of the outside circle 615 exactly matches the original CAD 3D model's hole diameter. The original hole is broken into multiple straight edges within the hole. The triangulation occurs inside the hole and the resulting hole size in the STL file is smaller than the original size. According to various embodiments, other rules may be set up when saving to a curved geometry model such that the inner circle 610 comports with the original size of a hole, or such that the original size is between the two circles 610 and 615. A standard bolt or pin designed based on the original dimensions may not provide a precise fit in the hole. The initial hole may have a larger diameter to fit a pin of the same size. This is true whether it is a circular hole cutout or a circular extruded boss, such as creating a pin. The STL file representative of a pin that is designed to fit in that hole may have a smaller volume than the original model based on the same STL triangulation size due to the loss of material from the triangulation. The inscribed sketch circle 610 has a diameter 0.27167 in. The circumscribed circle 615 has a diameter 0.28125 in. The original hole had a diameter of 0.28125 in.

Figure 8:
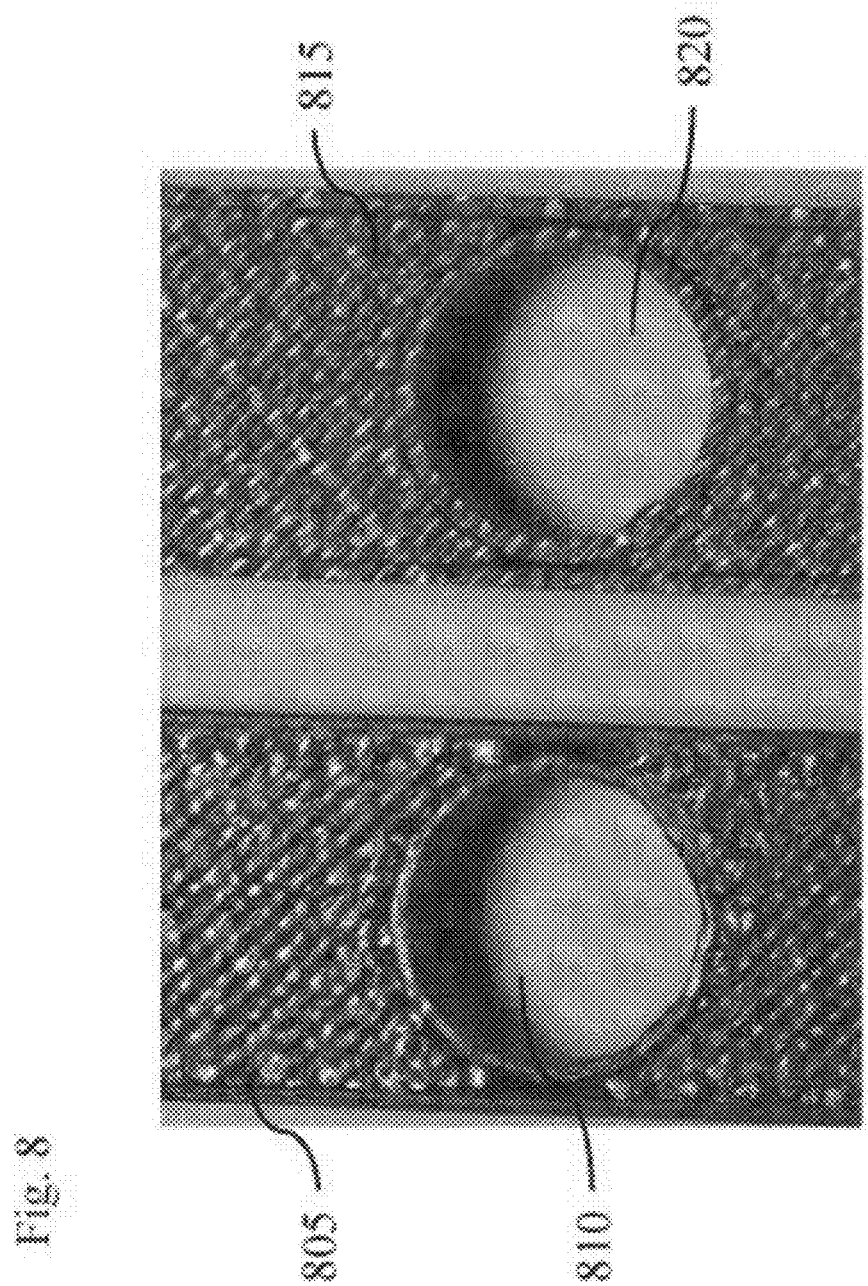
FIG. 8 is a close-up view of two holes in two different 3D-printed objects.

FIG. 8 is a close-up view of two holes 810 and 820 in two different 3D-printed objects. When converting a Solid-Works™ part model to the STL format, an option menu can be accessed in the Save As window. On the menu, the resolution of the STL file can be custom set using a slider bar. The custom settings can be used to obtain a certain hole diameter for fitting a pin of a given diameter.

In FIG. 8, two 3D-printed parts 805 and 815 with holes 810 and 820 are shown. The left-side part is the "coarse" STL schema and the right-side part is the "fine" STL schema. It can be seen that the part printed with the "coarse" STL setting shows faceted surfaces while the part printed with "custom", very fine, settings shows a hole that closely corresponds to its CAD model.

According to various embodiments, a similar scheme can apply given any other curved geometry. In one example embodiment, the specified custom resolution may not be known to someone who misappropriates a CAD model, and they may therefore not be able to accurately reproduce the object through 3D printing. In another embodiment, the specified custom resolution may be selected based on a particular type of 3D printer used by the creator. Even if someone misappropriates the STL file, the shape may not print with the proper tolerances on a different type of 3D printer or on the correct 3D printer configured to operate in the wrong mode As discussed herein, circular or curved geometries generated in an STL format are smaller in diameter than an original circle generated in a CAD program, such as Solid-Works™ In contrast, straight geometries remain largely unchanged when generating a model in an STL format. As discussed above, this can create a problem for printing precision fit parts or with curved components such as screws, bolts, etc. Such components may be used in engineering, biomedical, and/or dental applications, as just a few examples. These components have curved geometries, which can be exploited as a security element as described above. Accordingly, a 3D model comprising both curved and straight geometries that is converted to an STL format or to another suitable digital surface geometry schema may have curved geometries that have changed dimensions and straight geometries that have not.

In addition, that STL-formatted model may not be accurately scaled up or down after the curved geometries have been changed and the straight geometries have not. Therefore, a further element of the embodiments disclosed herein accounts for such dimensional tolerance change. This element may be implemented as a function in a CAD software program. For example, after a part design is optimized through a known and/or suitable shape optimization technique, such as finite element analysis, a user can click on a curved section or surface. The user can then opt to change the selected curved section or surface to make sure that the final dimension after converting/saving to an STL file will fit with the intended part. In other words, a curved section or surface, after optimization in CAD software, can be changed/adjusted so that the dimensions of the curved section or surface are optimized in accordance with the finite element analysis technique after the model is saved in an STL format such that the curved section or surface is saved as a series of straight geometries and/or surfaces.

The CAD program may be configured to change the geometries to different extents depending on the resolution that will be used when converting the 3D model to an STL file. According to one embodiment, instead of a user having to select curved surfaces to change, the CAD program may be configured to automatically recognize and adjust curved surfaces so that they will be optimized after saving/converting to STL format. In one example embodiment, this is implemented as part of the finite element analysis process. In another embodiment, the auto-selection of curved elements is a programmable function that is executed as the model is saved/converted to the STL format model.

According to various embodiments, the process described above, when optimizing curved sections and/or surfaces, can take into account the relevant tolerance levels that are set for the 3D model and the parts that the 3D model is to fit with. These aspects of the example embodiments can help a user make sure that the final dimensions of a model as saved in an STL file will comport to those of the intended part. In an example embodiment, the CAD software program is configured to implement this element by utilizing known correlation value(s) between a curvature in the original model and the change to a curve that occurs as a function of specifying the resolution for STL conversion.

Similarly, other aspects of printing a model affect the final product, so a CAD program may also be configured to take into account a print resolution of a printer, a print direction, a slicing scheme, and other factors. Thus, the curved surfaces may be adjusted so that tolerances are maintained after a model is saved as an STL file. These various factors can dictate how much a curved dimension must be adjusted so that the element is accurately reproduced when printed by a particular printer in a particular way. This too can act as a security element as disclosed herein such that, where a model is printed with a different printer or print method than that used to determine changes to the curvature prior to saving the model in an STL file, the model will not be printed with the proper tolerances.

In various embodiments, the CAD software program can also be configured to import an STL file and recognize surfaces that were previously curved in an original model before converting to the STL format. After recognizing such surfaces, that information can be used to allow a user to re-scale the entire model. For example, as discussed above, the dimensions of a hole change (e.g., are reduced) when a 3D model is saved as an STL file. The original circle is one created by connecting the corners of the triangles that now represent the edge of the hole. If the STL file is opened in a CAD program, the CAD program may be configured to recognize what was previously a curved surface and convert it back to a curved surface and/or to determine what the dimensions of the previously curved surface would have been. To do so, in an example embodiment, the CAD program is configured to recognize the original hole by identifying the triangles that represent the edge of the hole, identifying a circle that connects the corners of those triangles, removing the straight edges of the triangles, and replacing them with a surface that aligns with the identified circle. In this way, an STL file may be converted back to its original form, edited, etc., all while maintaining the tolerances/dimensions of the original model.

II. System(s) and Method(s) for Embedded Security Control using 3D Model Slicing (Including Spline Splitting)

The use of curvature can be extended to other security elements and uses. Embedding a surface in a component can serve as a security element, for example by using a "split" function of a CAD program such that an object is split into two or more distinct bodies. As an example, a rectangular prism solid body may be split into two equal halves by a straight surface created by a straight line. This results in two distinct solids, but without any material being removed. When the split 3D model is converted to an STL file, triangles do not cross the split surface.

Figure 9:
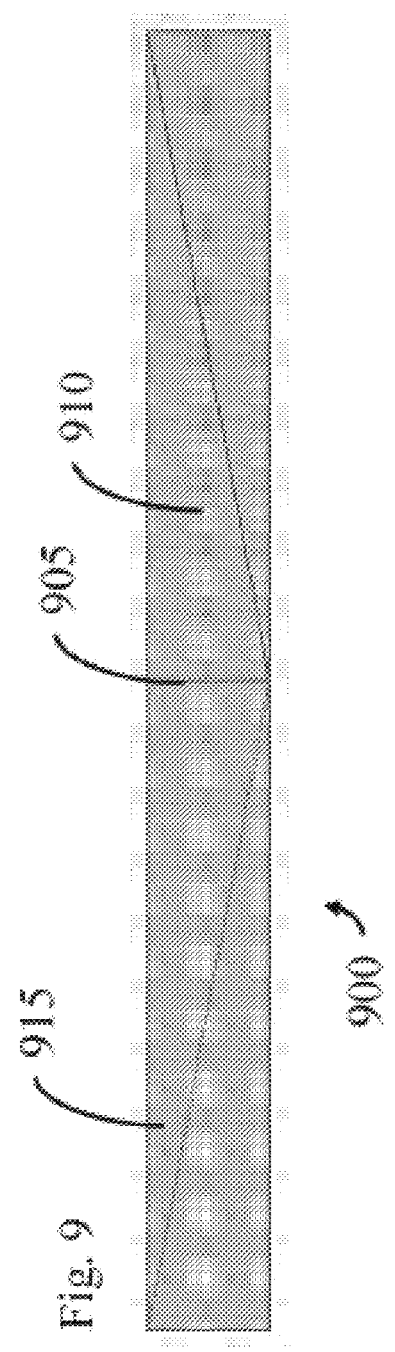
FIG. 9 is a top view of a rectangular 3D model containing a straight split surface element according to a digital surface geometry schema.

FIG. 9 is a top view of a rectangular 3D model 900 containing a straight split surface element according to a digital surface geometry schema (such as STL). The 3D model 900 includes a split line 905 and triangular surfaces 910 and 915 along the split line 905. When saving as an STL file, triangles are placed adjacent to the split surface. This prevents the model from being interpreted as a solid body when re-imported to SolidWorks™ or other CAD software. The triangles 910 and 915 that make up the two touching surfaces have the same coordinates but their orientations face one another. The software cannot determine which triangles belong to which solid, and so the shape can only be interpreted as a surface body.

In a case like this, a tool to merge the surfaces, such as a knit surface tool in SolidWorks™, can be configured to repair the shape and generate a solid body from the STL. Unless it is known that this surface (the split) is included to stop counterfeiting, a person stealing the design would not be able to recover the solid model. Thus, according to the embodiment of FIG. 9, multiple split surfaces in varying locations on an object and/or assembly can be used as a security element.

Figure 10:
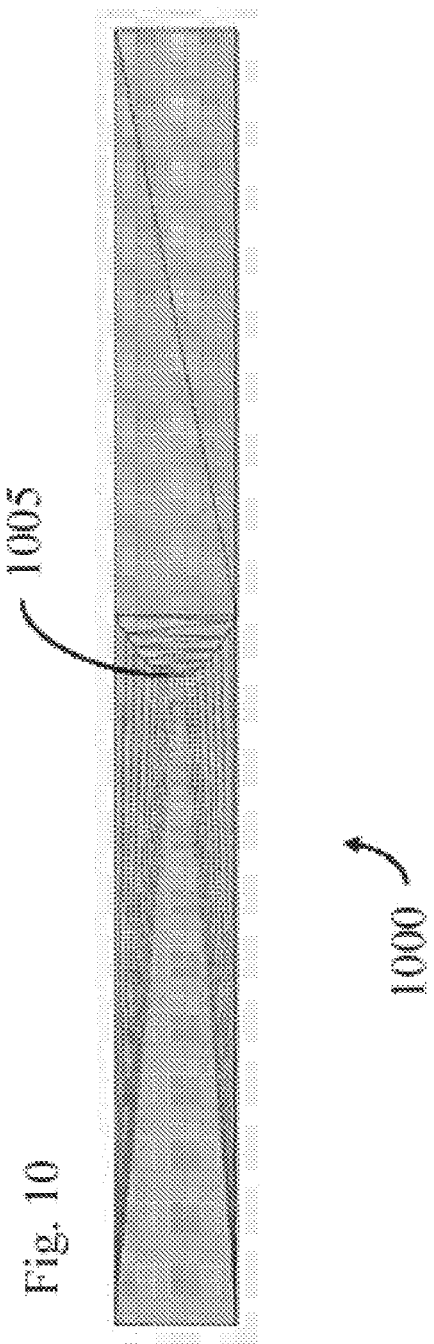
FIG. 10 is a top view of a rectangular 3D model split with a curved spline split element according to a digital surface geometry schema.

FIG. 10 is a top view of a rectangular 3D model 1000 split with a curved spline split element according to a digital surface geometry schema. The same rectangular solid as in the previous example can also be split with a curved line, plane, spline, surface, and/or shape, as shown in FIG. 10, using the "fine" resolution setting. In the embodiment of FIG. 10, the 3D model 1000 is split along the curved line 1005.

Figure 11A:
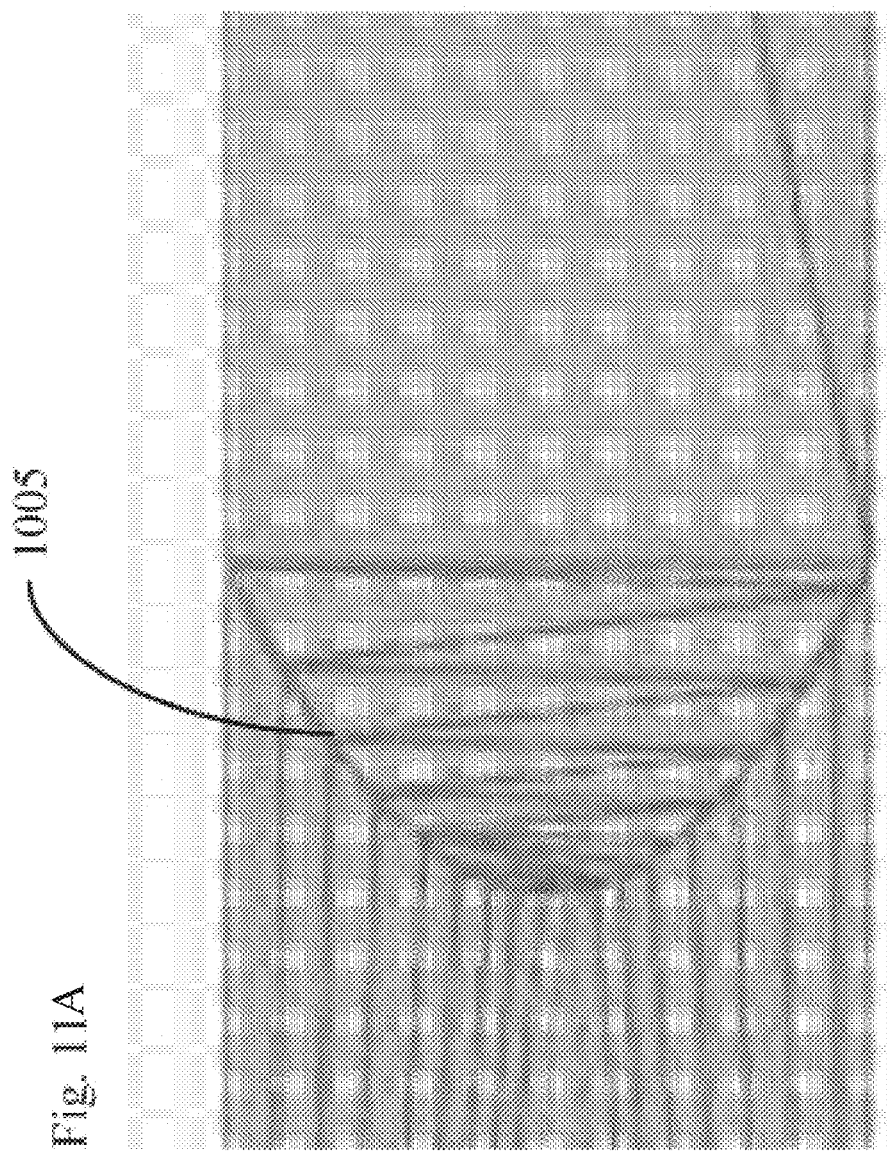
FIG. 11A is a close-up view of the rectangular 3D model split with the curved spline split element according to a digital surface geometry schema.
Figure 11B:
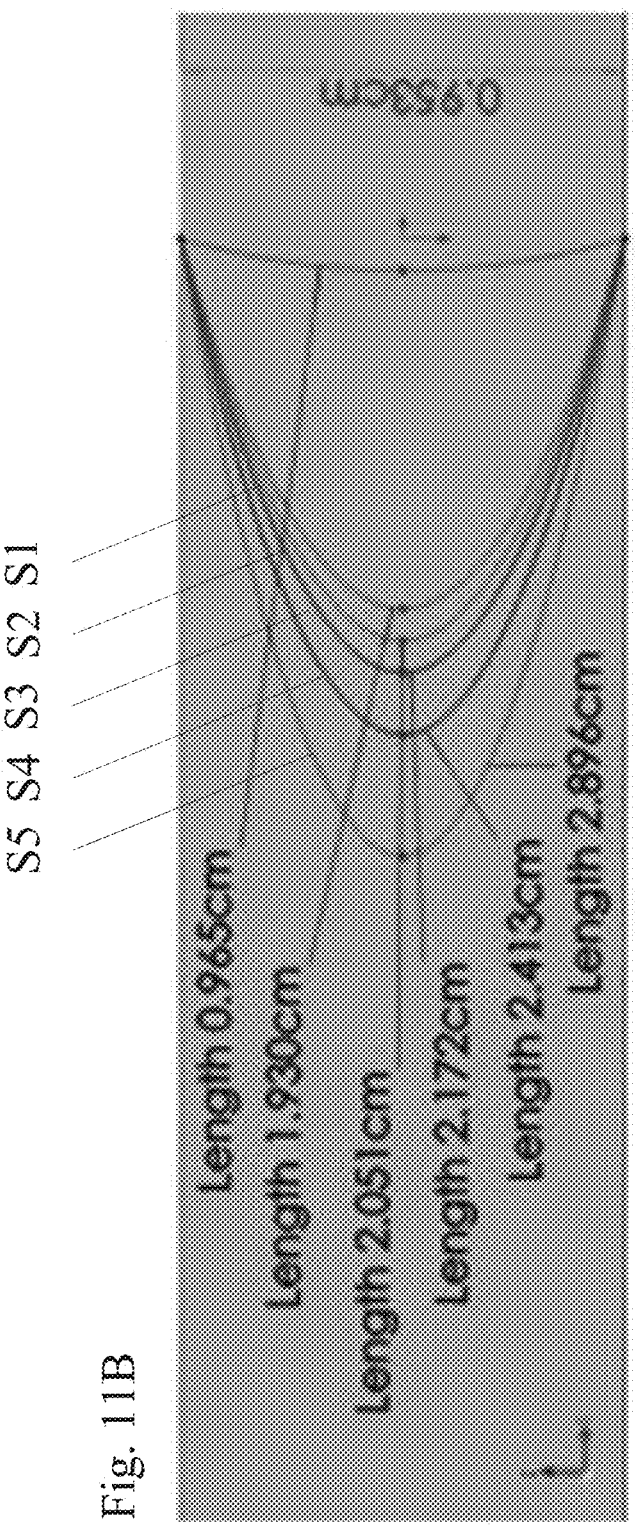
FIG. 11B is a close-up view of the rectangular 3D model split according to splines of different lengths.

FIG. 11A is a close-up view of the rectangular 3D model 1000 of FIG. 10, the 3D model 1000 being split with the curved spline split element according to a digital surface geometry schema. FIG. 11B is a close-up view of the rectangular 3D model 1000 being split according to splines of different lengths. In some embodiments, multiple splines (e.g., (S1 through S5, as shown) can be inserted in one model. Appearance of defects in the spline split specimen but not in the straight split specimen implies that this phenomenon is dependent on the STL conversion resolution and the curvature of the spline element. A series of splines of different lengths are used in the example embodiment of FIG. 11B. The first spline (S1) of length 0.9652 cm (0.38 in) is designed to be only slightly longer than the rectangular prismatic bar width of 0.9525 cm (0.375 in). The splines S2 and S3 are designed to be two and three times the length of S1, respectively. Here, a change in the spline length is used as a measure of its curvature because all splines are embedded in the specimen of the same size and the longer splines provide higher curvature. When saved in using the "coarse" STL resolution setting, all three models sliced in the x-z direction induce discontinuities around the spline element.

No discontinuities can be observed after slicing the model in the x-y direction for splines S1 and S2 but the model with S3 shows discontinuities. Therefore, three additional spline models (S21, S22 and S23) were created with lengths between those of S2 and S3 (S1 times 2.125, S1 times 2.25 and S1 times 2.5, respectively) to determine if slicing under x-y direction would induce any discontinuity in the intermediate cases. All three of these intermediate splines show discontinuities in the sliced models.

The models were printed in x-y and x-z directions. Similar to the results observed in sliced models, the printed specimens show that only the "coarse" STL file printed in the x-y orientation had a defect, while the "fine" and "custom" STL files were printed without a defect. However, when printed in the x-z direction, the spline split element is printed for all three STL resolutions. Thus, the final printing result is related to both the printing direction and STL resolution. For the same spline split element, only when saved in a higher resolution ("fine" or better) and printed under the x-y direction will the model produce a part without the discontinuity induced by the embedded spline element. This result denotes a relationship that can be utilized as a security element embedded in the 3D model, where prior knowledge of conversion resolution and printing direction can provide a high quality component without a discontinuity. Other combinations of parameters would provide a defective component. According to various embodiments, additional surfaces can be embedded in complex shaped industrial components. Existing curvatures and geometries can be used to develop elements that can help in distinguishing genuine products from replicas or counterfeits.

The results obtained on a material extrusion printer were repliated on a material jetting printer (Stratasys Objet30 Pro) using VeroClear material. The Objet30 Pro is capable of printing parts with a minimum layer thickness of 16 μm.

FIG. 12 is another close-up view of a rectangular 3D model split 1200 with a curved spline split element along the line 1205 according to a high-resolution digital surface geometry schema. FIG. 12 shows a detailed view of the triangulation produced at the maximum ("custom") setting/ resolution The maximum resolution setting produces significantly more triangles than even the "fine" preset settings in SolidWorks™.

FIG. 13 is a close-up view 1300 of gaps 1310 and 1315 that form from a spline split 1305 element according to a digital surface geometry schema. As in the previous example, using the knit elements tool in SolidWorks™ or a similar program to reassemble the original 3D model allows the STL to be re-interpreted as a solid body. However, because of the curvature, the triangulated faces of the two bodies resulting from the split do not intersect exactly. Thus, when the body is stitched back together the spaces between the lines of the triangles result in fine gaps due to the curvature, as shown in FIG. 13. Thus, the body that results from stitching does not have a single continuous surface across the left and right side parts of the component.

This mismatch represents an embedded design security element. By inserting the curved elements, it is possible to prevent anyone who handles the STL files from printing, recreating the original design, or making their own changes that could affect the part quality. However, the insertion of these elements should be done in a manner that does not affect how the slicing program interprets the STL to create the toolpath for printing.

Figure 14A:
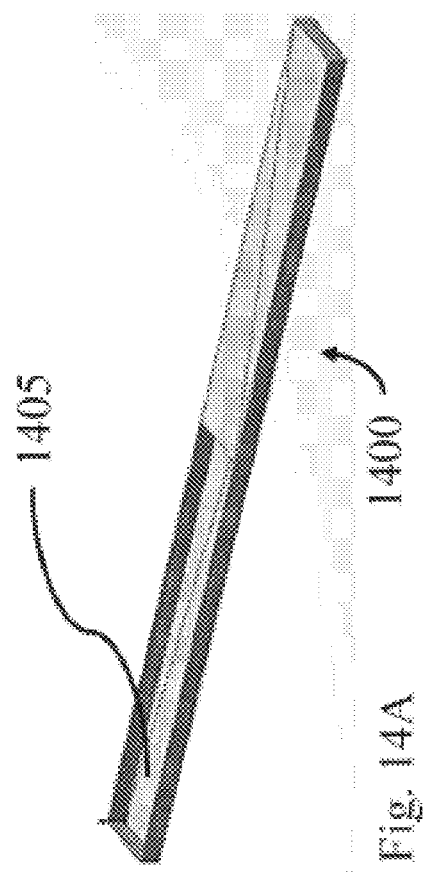

It is still possible to recover the original solid body if one understands how the part was originally split. This is an added security element because if someone misappropriates an STL file, this actor will not know how the object was split. FIGS. 14A-14C show steps for removing a plurality of surface geometry sections (14A), replacing them with a planar surface (14B), and knitting the remaining surface geometry sections together (14C).

Referring now to FIG. 14A, the surfaces that were separated due to the spline were all selected and deleted as shown by the space 1405 in the object 1400 of FIG. 14A. This leaves the empty space 1405 on the left side of the surface body, as shown in FIG. 14A. Since this was a simple rectangular specimen, all the faces deleted were planar. In the empty space, the SolidWorks™ surface command, for example, may be used to insert a new planar surface 1410 to fill in the empty gap 1405, as shown in FIG. 14B. Once the planar surface fills the empty gap, the surfaces can be knitted together to form one single surface body 1415. The single surface body forms an enclosed volume and it is possible to use the "thicken" element in SolidWorks™ for example, to create a solid body from the surface body. FIG. 14C shows the reconstructed solid body, which has the same dimensions and properties as the original solid 3D model.

For a person who is not familiar with the original specimen design, which is often complex for industrial components, it is very difficult to decide which lines or surfaces to remove from the geometry, introducing a security element that presents an obstacle for reproducing the original CAD 3D model. Advantageously, the use of multiple such surfaces, as described above, can make it very time consuming and/or practically impossible to recover the original design and/or print it in high quality. This security scheme can be applied to any industrial component. According to various embodiments, this scheme can also be used for split-manufacturing where a part is manufactured in several pieces and assembled after manufacturing.

Adding splits to a solid body in the CAD software affects the STL file that is created and prevents the CAD software from correctly reinterpreting the STL. However, one must also consider whether those added elements cause a difference in the quality and/or integrity of the final printed part, or if the slicing software of an individual 3D printer will recognize certain elements as being too small to print and smooth over the gaps or faulty faces. This possibility is considered for parts printed in various orientations such as lying flat and standing up in a Fused Deposition Modeling (FDM) printer, as the behavior is likely to be different depending on whether the elements lie within the slices or cross them. In other words, the choices for splits to insert and resolutions to select when converting the original 3D model into an STL file can be informed or calibrated based on the 3D printer used and on configuration(s) used with a particular 3D printer.

Because of differences between different slicing software and printer controllers, the results of resolution and split choices may be printer-dependent, adding another possible layer of security. For the embodiments discussed below, SolidWorks™ was used for CAD modeling and the Stratasys™ software and printers were used for 3D printing. However, such methods and systems as disclosed herein are portable to and/or may be implemented as part of other software and 3D printers.

Figure 15:
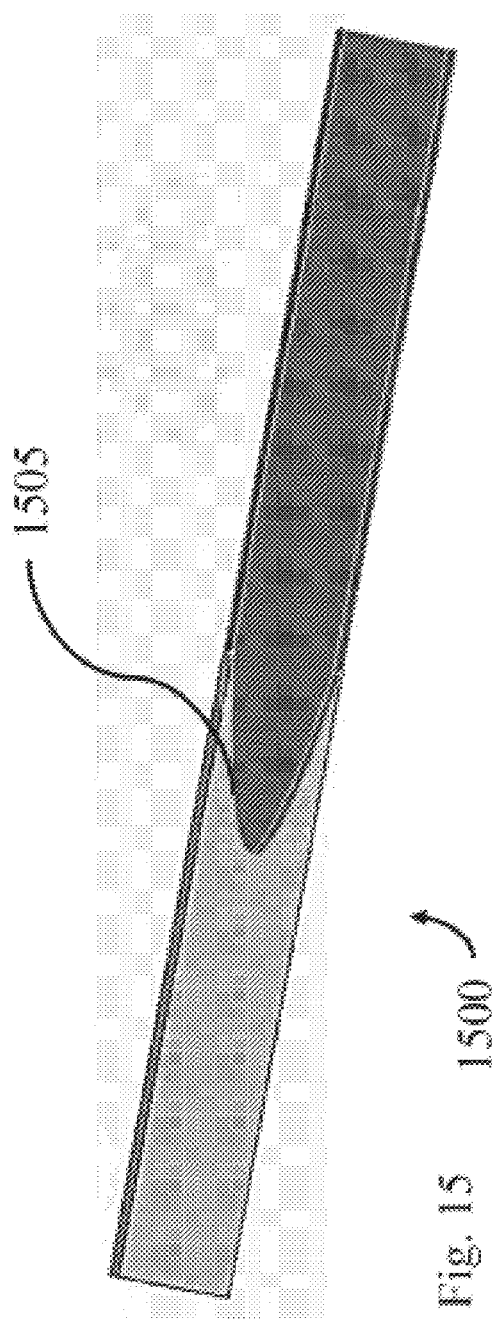
FIG. 15 is a perspective view of a CAD 3D model with a spline split element.

FIG. 15 is a perspective view of a CAD 3D model 1500 with a curved spline 1505 split element. Another CAD model with a straight split element is also generated. These two models are used as non-limiting examples. STL files for both models were saved using "fine" and maximum ("custom") resolution.

Figure 16A:
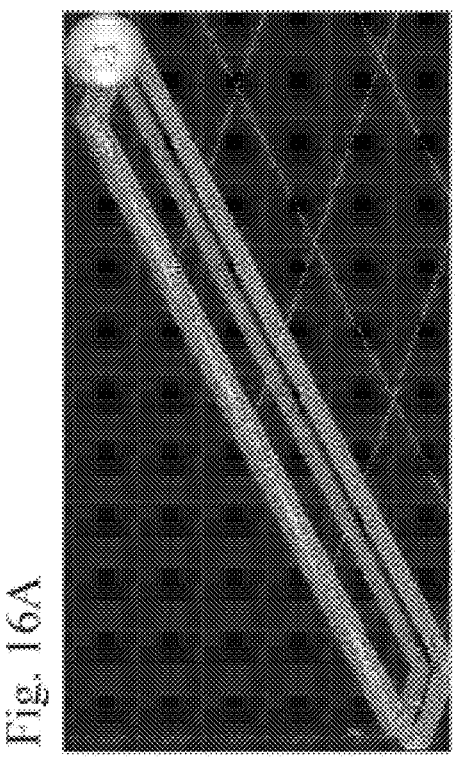
FIGS. 16A and 16B show toolpaths for printing 3D models.
Figure 16B:
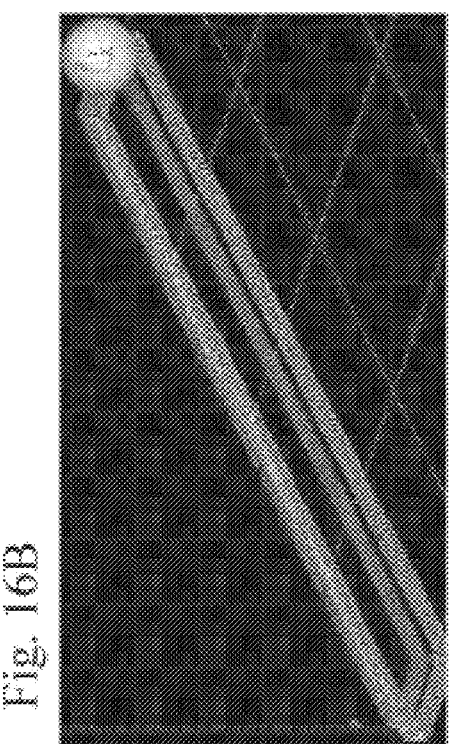

FIGS. 16A and 16B show the toolpaths for the models of FIG. 15. The thin white lines trace the outer boundary of the support material paths for each layer, and the thick white lines show the model material out boundaries. No discontinuity or traces that would indicate a change in the slicing as a result of the straight split or spline split are seen in the toolpaths.

Figure 17:
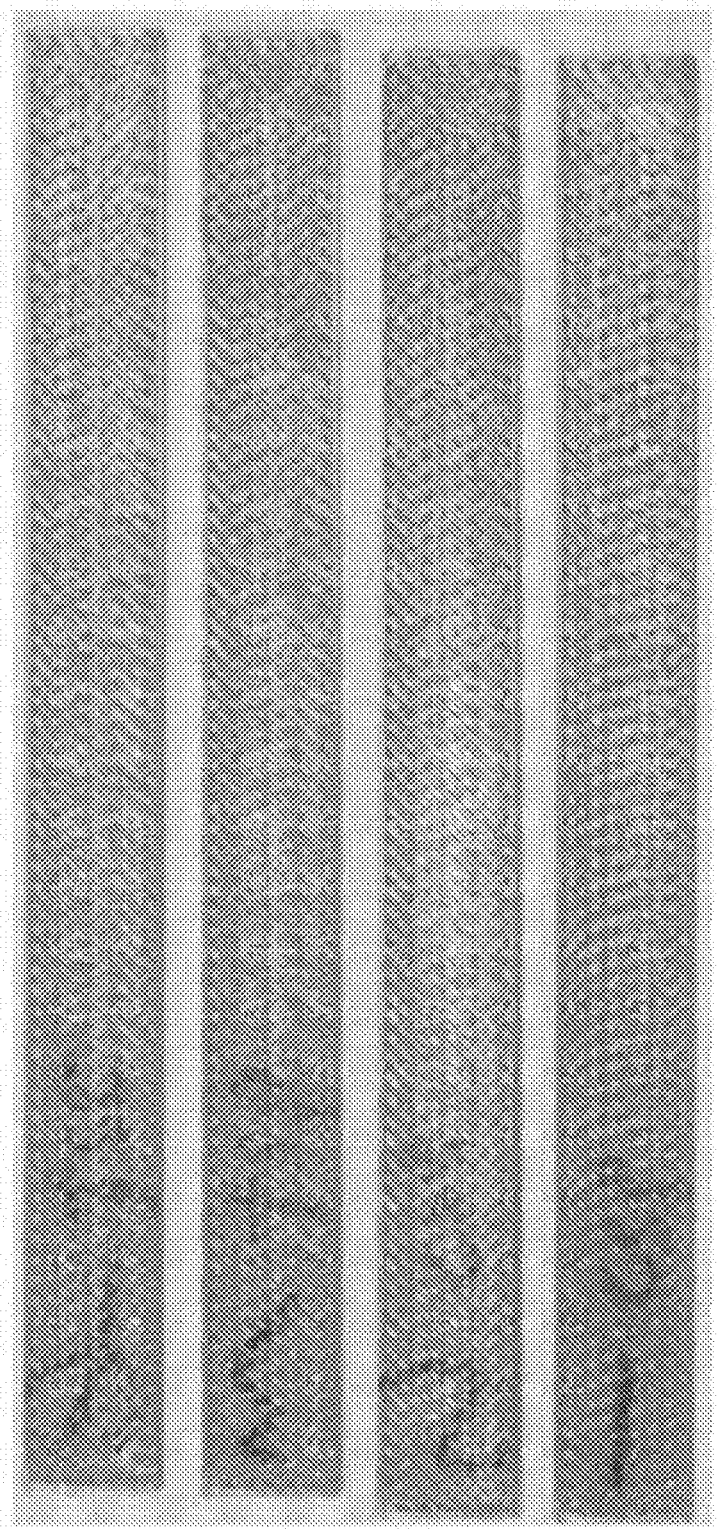
FIG. 17 shows specimens 3D-printed horizontally with straight line split elements.

FIG. 17 shows specimens 3D-printed horizontally with straight line split elements. FIG. 17 shows the printed parts, which show no interruption of the toolpath around the splits in the bodies. However, when the model with a curved split is converted to STL using the "coarse" resolution setting, problems arise in the slicing step.

Figure 18:
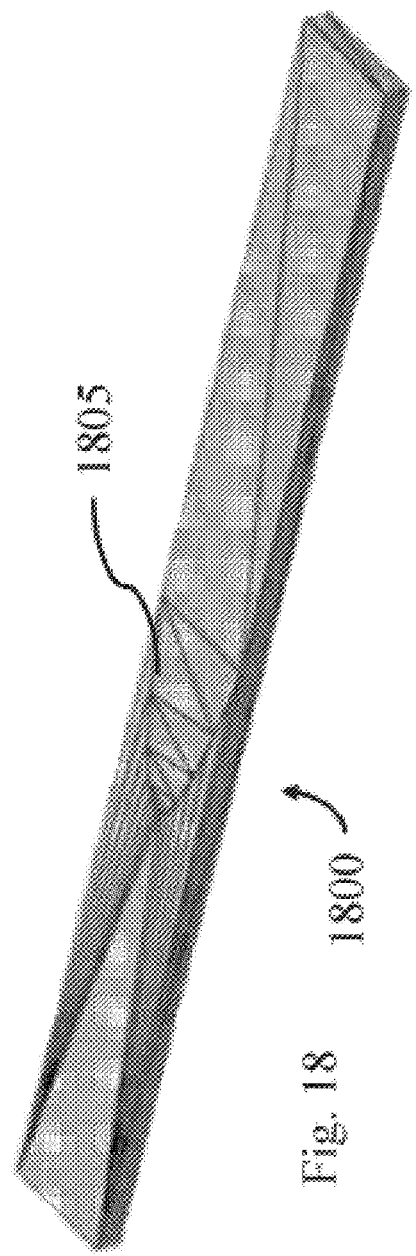
FIG. 18 is a perspective view of a 3D model with a spline split element according to a digital surface geometry schema.
Figure 19:
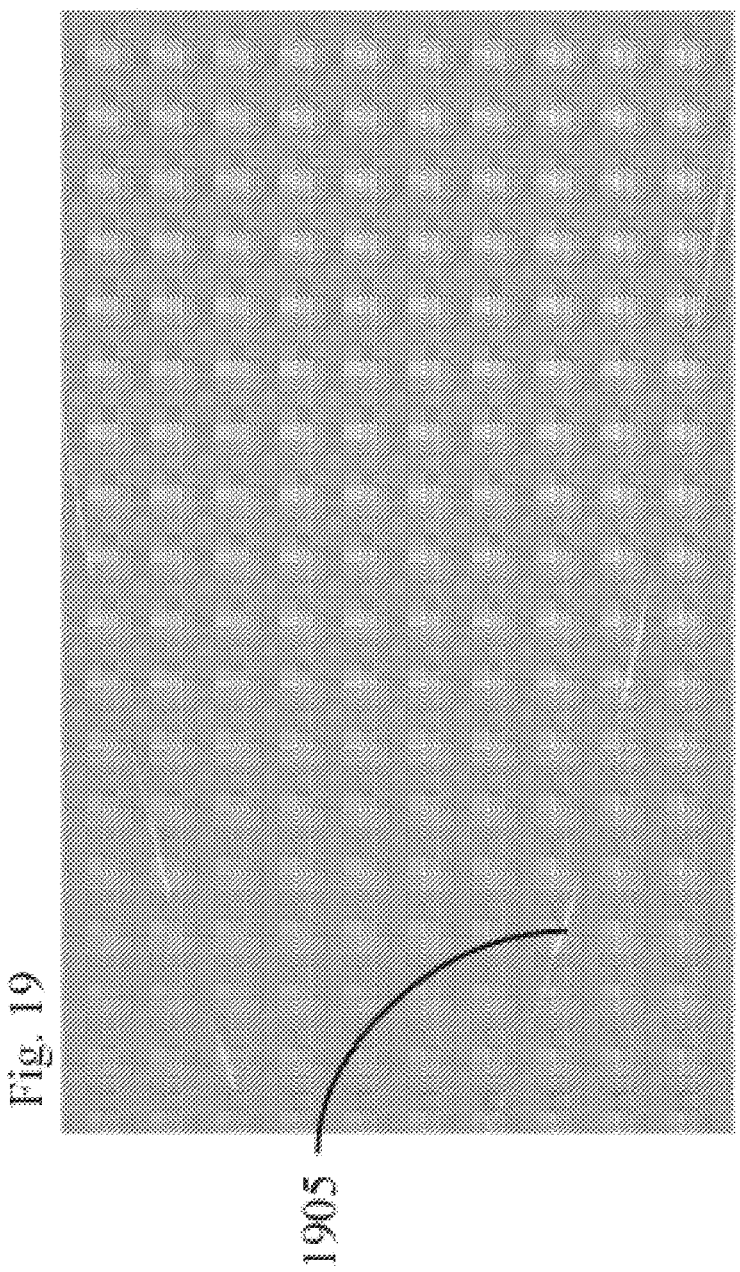
FIG. 19 shows a close-up view of gaps in a CAD 3D model after importing a digital surface geometry schema with a spline split element.

The coarse STL of the curved split body is shown in FIG. 18, and a closer view of the triangulation is shown in FIG. 19. FIG. 18 is a perspective view of a 3D model 1800 with a spline 1805 split element according to a digital surface geometry schema. FIG. 19 shows a close-up view of gaps in a CAD 3D model after importing a digital surface geometry schema with a spline 1905 split element.

Figure 20:
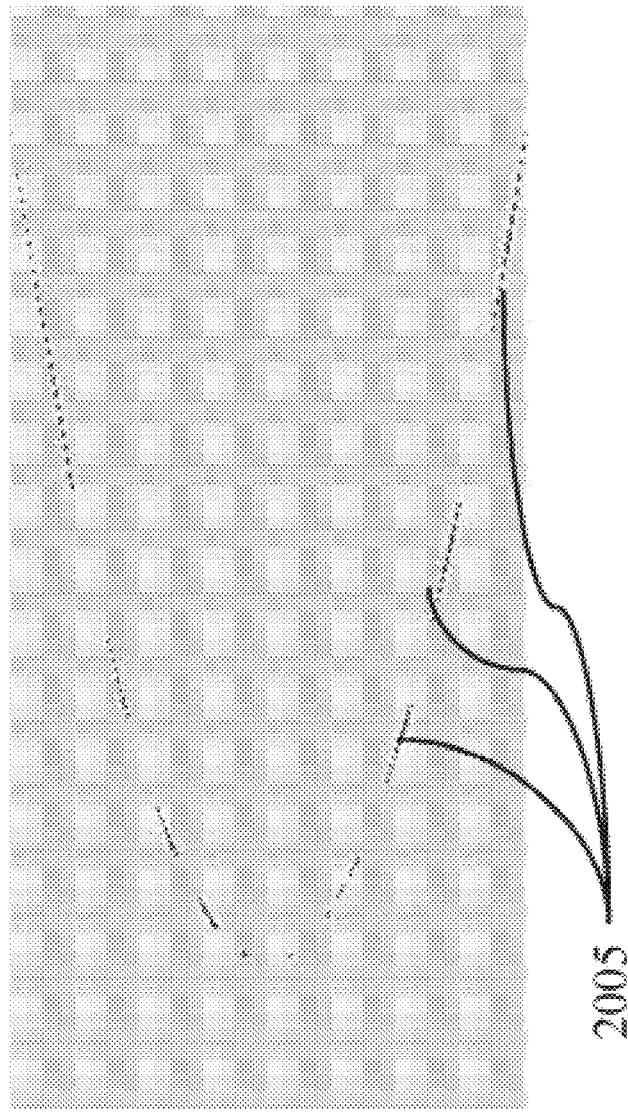
FIG. 20 shows another close-up view of gaps in a CAD 3D model after importing a digital surface geometry schema with a spline split element.

FIG. 20 shows another close-up view of gaps 2005 in a CAD 3D model after importing a digital surface geometry schema with a spline split element. The top view of the model of the example embodiment, saved using "coarse" resolution in CatalystEX™ is shown in FIG. 20, further showing a visible spline before it was sliced.

Figure 21:
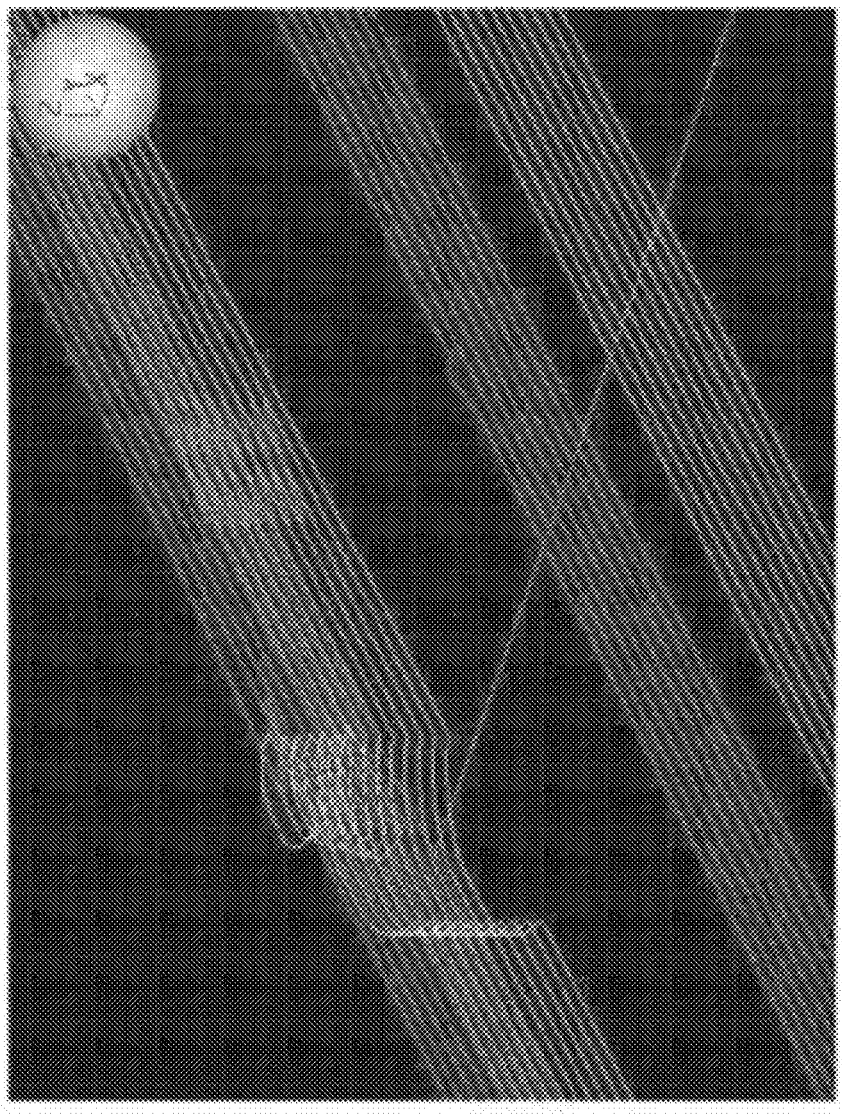
FIG. 21 shows a close-up view of discontinuity from a spline split element in to a sliced 3D model.

The sliced "coarse" model is shown in FIG. 21. FIG. 21 shows a close-up view of discontinuity from a spline split element due to the curvature of the spline element in a sliced 3D model. The discontinuity seen in FIG. 21 is large enough that the slicer does not ignore it when generating the toolpath. The location and nature of the discontinuity depend on the slicer settings. This causes a significant change in the printing behavior, which can be seen from the extra support material added near the edge of the split underneath the model. The lines inside of the model also indicate that some of the gaps are interpreted as significant by the slicer, causing the printer to try to produce these gaps in the model by stopping the flow of material at these spots.

Figure 22:
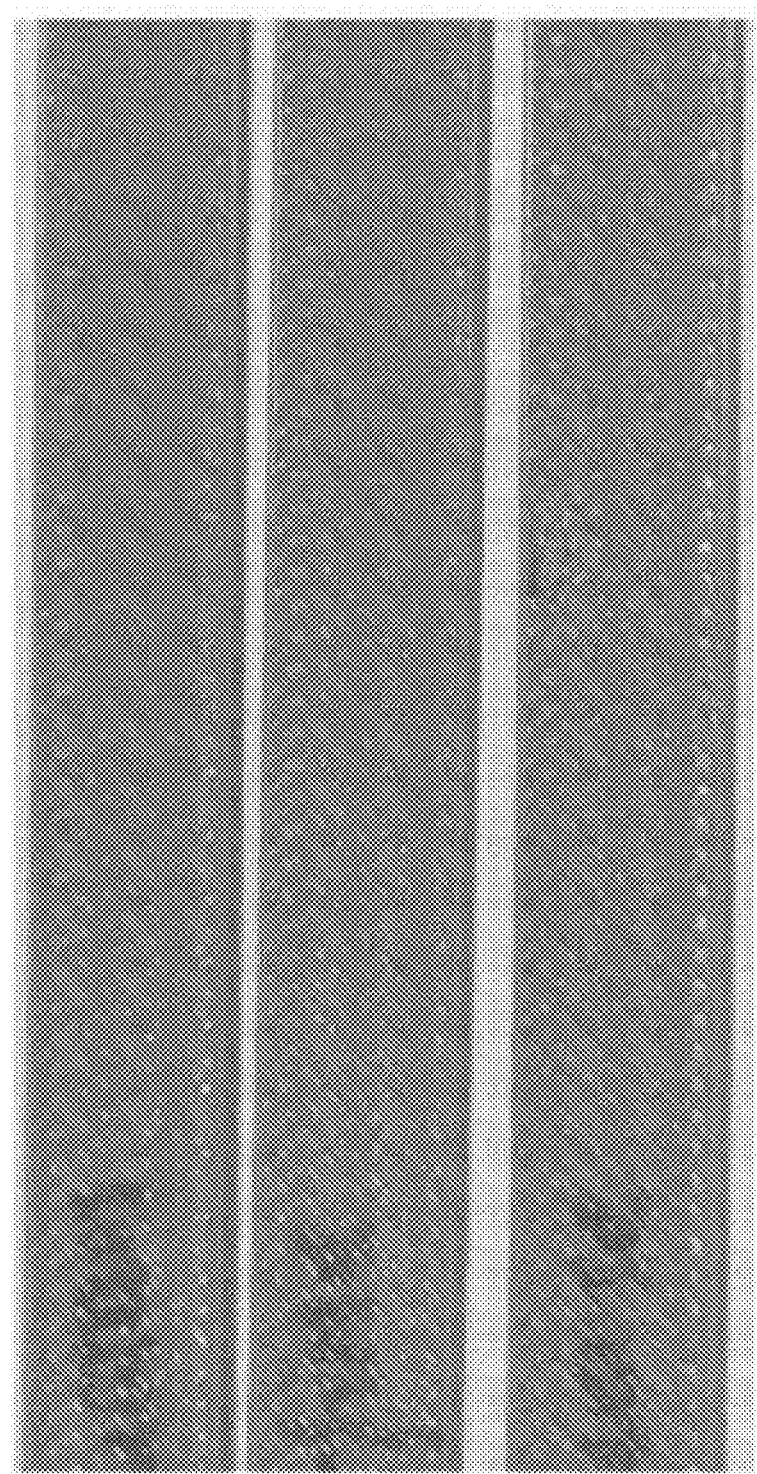
FIG. 22 shows specimens 3D-printed with a spline split element associated with different resolutions used when converting 3D models to a digital surface geometry schema.

The parts printed from these STL files are shown in FIG. 22, along with the "fine" and "custom" resolution parts for comparison. FIG. 22 includes specimens 3D-printed with a spline split element associated with different resolutions used when converting 3D models to a digital surface geometry schema. The part produced from the "coarse" STL schema has an obvious discontinuity in the toolpaths, which causes the under-filled region observed in the printed parts.

Figure 23:
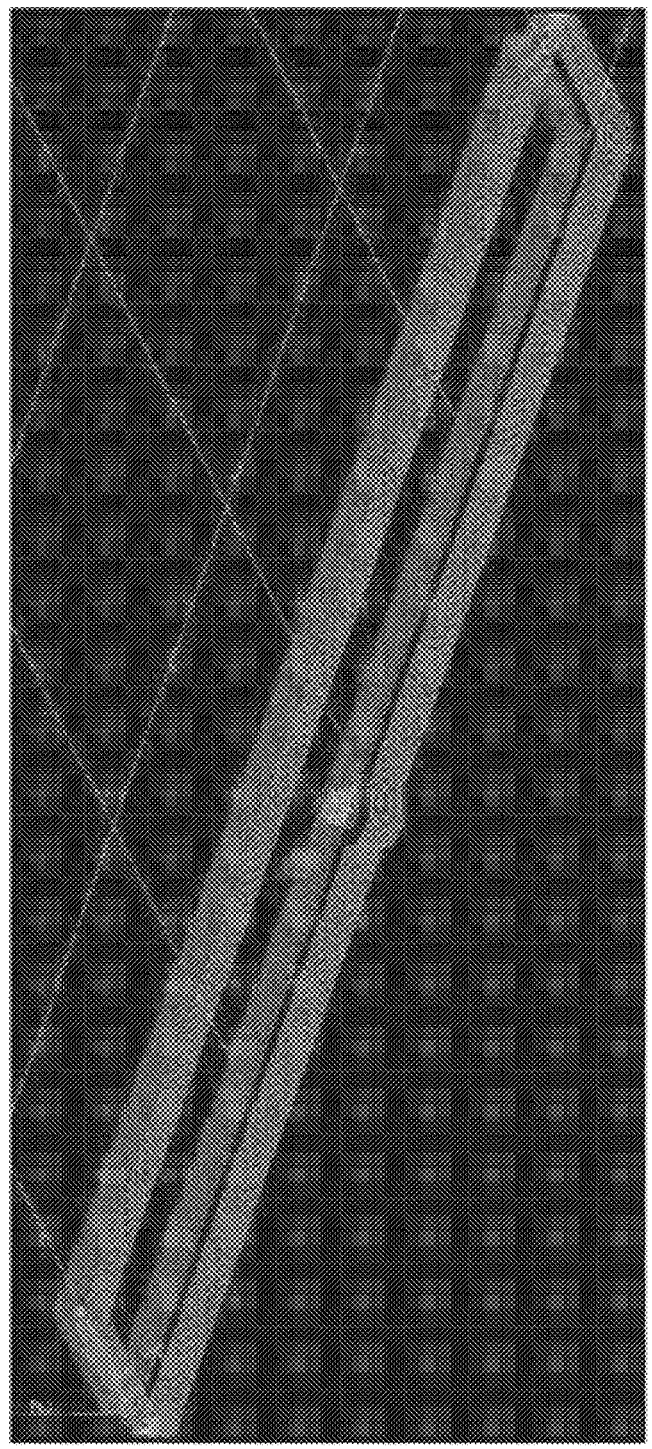
FIG. 23 shows a sliced 3D model with a spline split element placed to longitudinally align with an x-axis.
Figure 24:
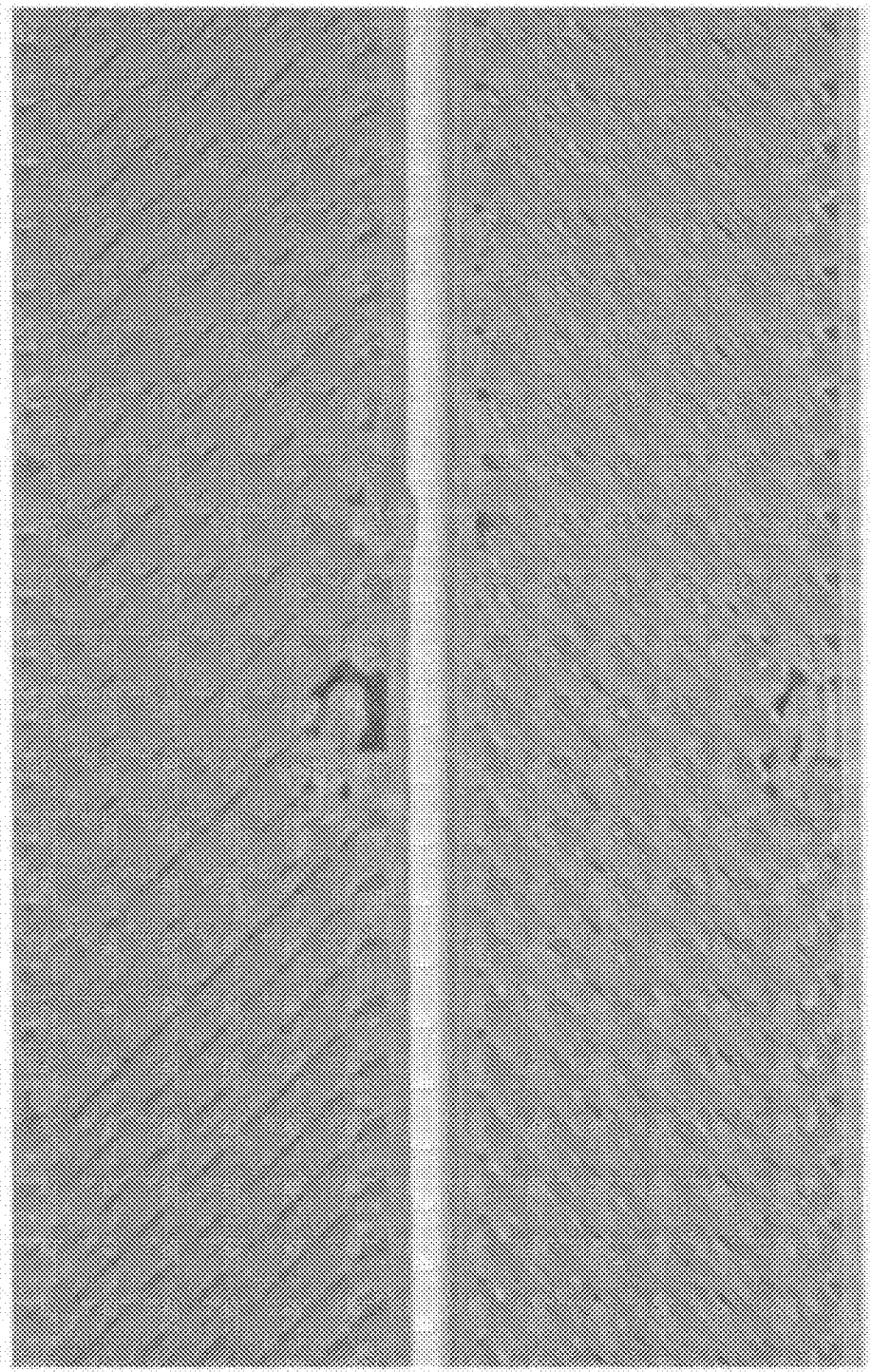
FIG. 24 shows a close-up view of 3D-printed specimens that have a spline split element and are printed in different x and y directions, respectively.

The same model was also printed in the x-direction of the printer (all others were printed in y-direction), as shown in FIG. 23, to investigate the effects of changing longitudinal direction. FIG. 23 shows a sliced 3D model with a spline split element placed to longitudinally align with an x-axis. The sliced models in both directions have the same discontinuity around the spline. Comparison of the 3D-printed parts is shown in FIG. 24. FIG. 24 shows a close-up view of specimens 3D-printed that have a spline split element and are printed in different x and y directions, respectively.

A summary of these results for printing in the x-direction of the printer orientation is given in Table 6 below. While the models saved using "fine" or maximum STL resolution have no discontinuity or defects in the slicing or printing step, models saved using "coarse" resolution exhibit printing defects.

TABLE 6

Summary of parts printed in x-direction with different STL file resolutions.

| Samples printed in x-direction | Visible gap before slicing? | Can it be sliced? | Printable? | Visible gap after slicing? | Visible gap after 3DP |
|---|---|---|---|---|---|
| Fine spline | Y | Y | Y | N | N |
| Fine straight | N | Y | Y | N | N |
| Custom spline | N | Y | Y | N | N |
| Custom straight | N | Y | Y | N | N |
| Coarse spline (higher curvature) | Y | Y | Y | Y | Y |

Figure 25A:
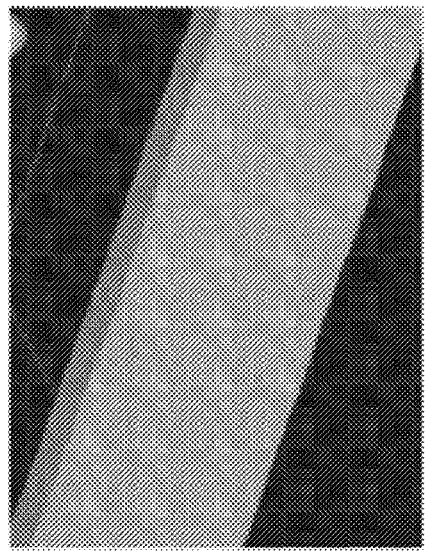
FIGS. 25A-25C show various levels of visibility of a spline split element according to different resolutions used to convert a CAD 3D model to a digital surface geometry schema.
Figure 25B:
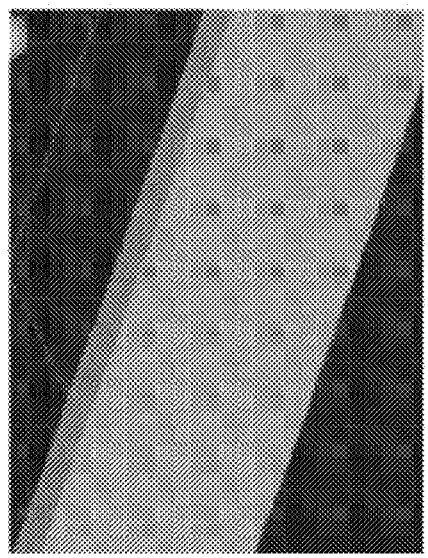
Figure 25C:
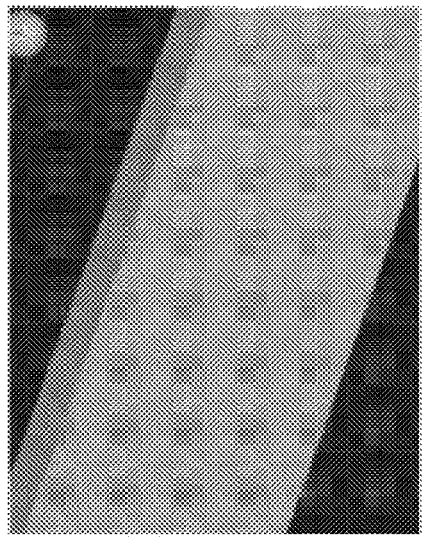
Figure 26A:
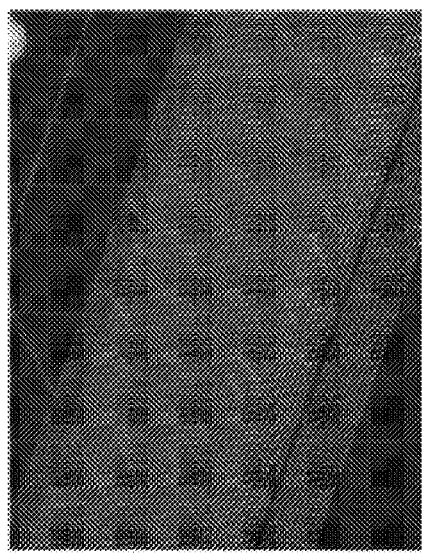
FIGS. 26A-26C show a close up view of sliced view 3D models having spline split elements according to different resolutions used to convert a CAD 3D model to a digital surface geometry schema.
Figure 26B:
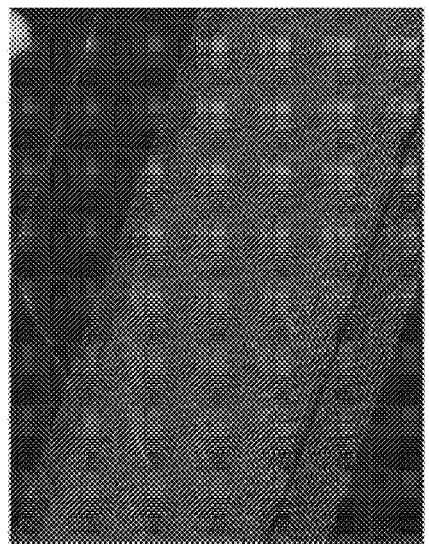
Figure 26C:
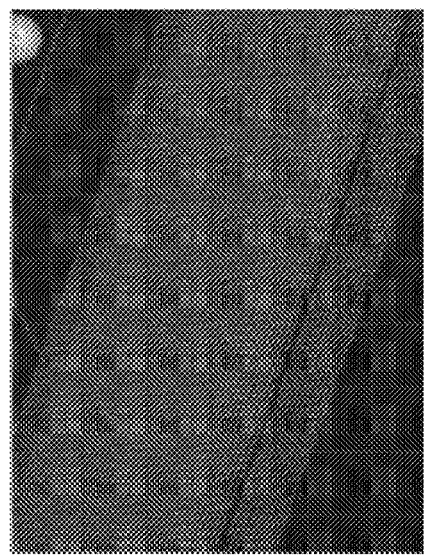

The same models as before (FIGS. 25A-C), with curved split bodies in coarse, fine, and maximum resolution, are also sliced with the model turned on its side, as shown in FIGS. 26A-C. FIGS. 25A-25C show various levels of visibility of a spline split element according to different resolutions used to convert a CAD 3D model to a digital surface geometry schema. FIGS. 26A-26C show a close up view of sliced view 3D models having spline split elements according to different resolutions used to convert a CAD 3D model to a digital surface geometry schema. The solids are shown in FIGS. 25A-C, and gaps in the model are visible in the "coarse" and "fine" models. The toolpaths in FIGS. 26A-C show visible discontinuities on all three models after slicing due to the spline element from an isometric view. It can be seen from those figures that the "coarse" model has the most discontinuities, which decrease as the STL resolution goes up.

The generated toolpaths (G-code) for the above three models with the spline split elements saved in "coarse", "fine" and "custom" resolutions were exported in a file format (.cmb) that is compatible with the Stratasys™ Dimension Elite 3D printer.

Figure 27:
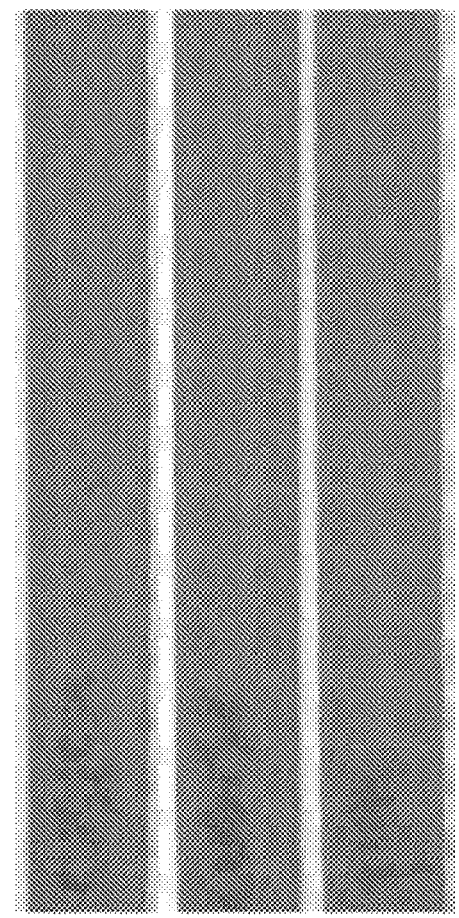
FIG. 27 shows a top view of 3D-printed specimens having spline split elements according to different resolutions used to convert a CAD 3D model to a digital surface geometry schema.

FIG. 27 shows a top view of 3D-printed specimens having spline split elements according to different resolutions used to convert a CAD 3D model to a digital surface geometry schema. In other words, FIG. 27 shows a top view of the final printed parts, where the surface discontinuity due to the spline can clearly be seen under each of the three resolutions.

Figure 28:
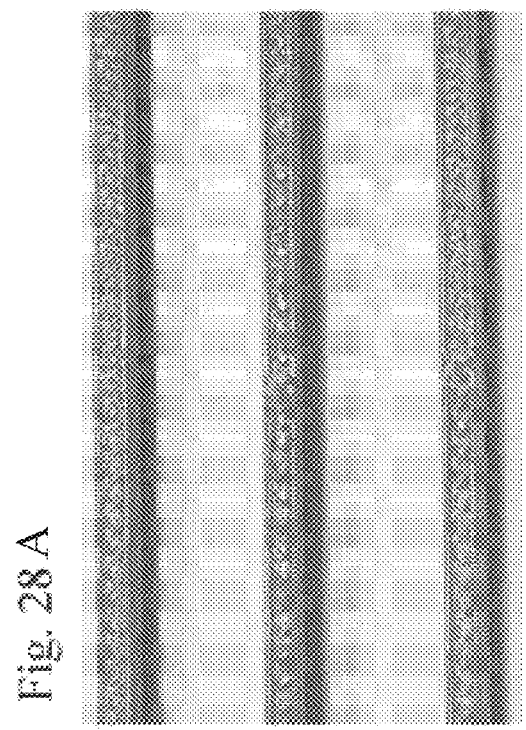
FIGS. 28A-28B show the specimens 3D-printed having spline split elements according to different resolutions used to convert a CAD 3D model to a digital surface geometry schema.

FIG. 28A shows a side view of specimens 3D-printed having spline split elements according to different resolutions used to convert a CAD 3D model to a digital surface geometry schema. In other words, FIG. 28A shows side views of the final printed parts. Noticeable inconsistencies are observed at the position where the spline ends. This, however, happens under the "coarse" and "fine" STL resolution and not the highest, "custom", resolution. In this case the gaps are oriented at an angle, therefore, their area in each slicing plane is larger than other silicing orientation where the specimen is flat on the build plate in x-y orientation. This causes the slicer software to ignore fewer of the gaps compared to the other printing orientation.

The manner in which the slicer interprets voids (gaps) in the model may depend on which program is used to generate the digital surface geometry schema and on the settings thereof. A summary of the results for models printed in the vertical orientation is given below in Table 7A.

TABLE 7A

Summary of parts printed in z-direction with different STL file resolutions.

| Samples | Visible gap before slicing? | Can it be sliced? | Printable? | Visible gap after slicing? | Visible gap after 3D Printing? |
|---|---|---|---|---|---|
| Coarse spline | Y | Y | Y | Y | Y |
| Fine spline | Y | Y | Y | Y | Y |
| Custom spline | N | Y | Y | Y | Y |

The example above illustrates that knowing the orientation of the part for printing on the build plate can be useful for implementing security elements and embedding them into a 3D model. Such spline elements will create defects if the corresponding parts are printed by an unauthorized actor using the wrong resolution and orientation specifications. Thus, in an example embodiment, these specifications can be used for securing the design such that only the creator will know the exact conditions and settings of the 3D printer to obtain a defect-free, high-quality part.

As disclosed herein, certain security elements can be embedded that are determined based on the resolution of a printer, a print direction, and other factors. Another factor to which the security element may be tailored is the slicer software used. Suitable slicer software, as discussed above, is used and/or configured to convert STL schemas to slices that are printed. According to various embodiments, different slicing schemes could be used to produce varying print outputs of a security element. For example, in some embodiments, a slicing scheme may specifically be tailored to overlook a security element embedded in a model. For instance, if a model containing miniature elements is sliced in such a way that those elements are lost between slices, the model would print without them. However, if the model is sliced in such a way that those elements would lie on the slices, they will print. In some embodiments, this scheme can be used as a security scheme, where an actor with no knowledge of the original design may misinterpret the miniature elements, which will act as defects and lower the quality of the printed component. In some embodiments, this scheme can be used as design tool where miniature elements, which are on the order of slice thickness, can be printed accurately, but may not be printed accurately by a person with no knowledge of the original design.

In another example embodiment illustrative of spline splitting for security purposes, a spline (curve) split element creates a massless separation inside a single body. The split element cuts through the middle of a standard tensile test bar, where the length of spline (21 mm) is 3.5 times the width of the tensile bar gauge section (6 mm). In the CAD file, two bodies are formed within one single part due to the presence of the spline, with zero distance or volume separating them. Next the CAD file is converted as an STL file. Several different STL resolutions are possible during file convert. The finer resolutions use a greater number of triangles to represent the geometry and result in larger file size. A representative model is converted using the "coarse" resolution setting in SolidWorks™. The difference in the tessellation along the spline in two parts of the geometry results in mismatch at the corners of triangles located at the spline.

An investigation into implementation of the spline split element in FDM printed components is performed on different combinations of STL resolutions and printing orientations. "Coarse" and "fine" resolutions are preset options in SolidWorks™, while the "custom" setting can provide the highest resolution by manually adjusting the angle and deviation permitted for a curve to the smallest possible values. The STL file is imported into the slicing software to generate the G-code file containing the 2D toolpaths. The Preview function in the slicing software allows visualization and navigation of the 2D tool paths generated for each layer of the 3D model. The same set of slicing properties are used for preparing the tool path for printing, including 0.01778 cm layer resolution, solid model interior, smart support fill, and STL unit of millimeters. Using these slicing properties, the models oriented in x-y and x-z printing orientations show different slicing results. When oriented in the x-y direction, the sliced model does not show discontinuity or other signs indicating the existence of the split. Further, models saved using the "fine" and "custom" STL resolution settings show similar slicing results under the x-y orientation. Thus, the tensile bar models will not be printed with discontinuity under the x-y orientation for all STL resolutions. However, when the model is placed and sliced in the x-z orientation, discontinuity around the spline element can be observed for all STL resolutions. The presence of a discontinuity in the sliced model makes it likely that the element will also appear in the printed specimens.

The CAD models are 3D-printed using a fused deposition modeling (FDM) based Stratasys Dimension Elite 3D printer. This printer can print a model material (ABS) and a dissolvable support material (SR-10™/P400SR™ Soluble Support Material-acrylic copolymer). Reference models (standard tensile specimens without a split element) are also printed under both printing orientations to compare with the spline split models. Unlike the results observed in sliced models, the printed specimens show that the "coarse" STL resolution file printed in x-y orientation has a surface disruption but in a less regular shape compared to x-z direction. Higher STL resolutions can minimize or even neglect this disruption, leaving the surface texture the same as intact samples. However, when printed in x-z orientation, the spline split element is printed for all three STL resolutions.

The results obtained on the FDM printer are replicated on a material jetting printer (Stratasys Objet30 Pro) using VeroClear material. The Objet30 Pro is capable of printing parts with a minimum layer thickness of 16 μm, as compared to 178 μm for the FDM printer used previously. Similar results are obtained in terms of presence or absence of the spline element with respect to the STL resolution and print orientation even for the resin printer, providing a broader context for these results. It can be concluded from both the ABS thermoplastic specimens and the VeroClear photopolymer specimens that the spline split element impacts the model integrity when printed.

Embedding the spline element in the standard tensile test specimen allows testing the specimens to obtain quantitative measurements of the mechanical properties in the presence and absence of the split element. Therefore, tensile tests are performed on four groups of 3D-printed specimens under the same set of slicing properties. The summary of tensile properties is given in Table 7B, where "Spline x-y" and "Spline x-z" refer to specimens designed with spline split element printed in x-y and x-z orientations, respectively, and "Intact x-y" and "Intact x-z" refer to the reference specimens with no spline split element printed in x-y and x-z orientations, respectively. For both directions, ultimate tensile strength and Young's modulus are comparable between the intact and spline split samples, but the average failure strain value for spline split samples is at least 50% less than the intact samples. Similarly, the toughness of intact samples is at least twice that of the specimens containing the split. The fracture starts at the tip of the spline, causing premature failure of the specimen, and results in the lower measured toughness.

TABLE 7B

Tensile properties of specimens containing spline split element 3D-printed by FDM printer. Intact samples are tested for reference.

| Property | Spline x-y | Spline x-z | Intact x-y | Intact x-z |
|---|---|---|---|---|
| Young's modulus (GPa) | 1.89 ± 0.04 | 2.10 ± 0.05 | 1.98 ± 0.05 | 2.05 ± 0.03 |
| Ultimate tensile strength (MPa) | 24 ± 1.1 | 31.5 ± 0.5 | 30 ± 0.2 | 32.5 ± 0.3 |
| Failure strain (mm/mm) | 0.015 ± 0.001 | 0.021 ± 0.001 | 0.029 ± 0.001 | 0.077 ± 0.041 |
| Toughness(kJ/m3) | 295.4 ± 94.2 | 453.6 ± 29.5 | 632.1 ± 33.2 | 3367.4 ± 902.8 |

The example of the embodiment described above is a standard tensile specimen with simple geometry. Engineering designs often include complex and multi-component systems that include many curves, lines, surfaces, and construction lines. The addition of one or more surfaces for security and identification purposes in such complex models is possible with a minimal chance of detection. In addition, such elements can overlap or cut across other design elements for obfuscation. Variations of such elements based on the same principle can be developed to use in different designs. These elements work independently of cybersecurity tools implemented on the network, files, or identification codes and/or marks to guard against duplication from stolen files.

III. System(s) and Method(s) for Embedded Security Control Using Geometric Bodies Separated with Distance A rectangular specimen can be split as described above, and a chspe representative of a part of the specimen can be moved by a small displacement amount such that the two split solid bodies of the CAD model are separated. In one example embodiment comprising a series of tests, when the specimen had a small gap between its two bodies, the resulting 3D-printed part was very fragile and separated into two pieces easily or was otherwise defective. These results were similar regardless of the orientation on a printing bed.

In order to implement shape displacement as a security element, one may modify the STL file in the CAD program before sending it to be 3D-printed. In order to implement this security element, a sketch of a straight line (or a surface) may be used to split the model into two separate bodies. When the 3D model has been separated, one of the bodies can be moved according to specific coordinates in the x-y coordinate system of the model. Advantageously, in the example embodiment, these coordinates' values will only be known by the company and/or creator that designed the product. The coordinates are not stored in the STL file once it is created. The separation distance (displacement amount) can be very small so that the resulting printed part will still be printed as one piece.

After moving the body to a new location, the CAD model can be saved as an STL. When saving to an STL file, the coordinates of all the new shapes are positive by default, meaning that the original 3D model may be moved so that the model is placed entirely in the positive space of the coordinate system. While embodiments of the present disclosure are not limited to any particular software, in one embodiment, in order to to prevent the original coordinate system from moving to a new location, a corresponding option can be enabled using the Save As window when converting the 3D model to an STL schema. In an example embodiment, when saving to an STL format, the option "Do not translate STL output data to positive space" can be enabled in order to preserve the existing coordinate system. Advantageously, if an STL file is stolen or compromised, the thief will not know the coordinates and therefore will not be able to shift the bodies back together. Further, the STL file will not generate a well-printed part unless it was modified. The creator of the shape can simply open the STL file and shift the body back using the known coordinates. Subsequently, the STL file can be sent to be 3D-printed to obtain a high-quality shape that conforms to the original design specifications.

IV. System(s) and Method(s) for Embedded Security Control Using Surface Security Features In one embodiment, during the translation from a CAD drawing to the STL file format, SolidWorks™ treats some elements differently. Where a solid or a surface sphere was embedded inside a solid material without first removing any material, the 3D model prints the support material for the area of sphere. This indicates that when SolidWorks™ converts these CAD models into an STL, the normal of the sphere is directed inwards. The normal direction information in the STL file tells the 3D printer where the boundary of the part is. In other words, the normal direction is indicative of the environment outside the shape. If the boundary forms an enclosed volume that will is not treated as solid, such as a sphere, support material is used to fill in this area.

In another embodiment, when material is first removed from the 3D model to create an empty space for the sphere to fit in, the conversion process to an STL file determines the normal direction information differently. If the material of the sphere in a rectangle block model is first removed, the 3D model comprising an embedded solid sphere will be printed with mono-material. The 3D model comprising an embedded surface sphere will be printed with support material filling comprising the spherical volume. During the conversion from CAD to STL, the normal direction for the solid sphere is outward and the block normal direction is outward as well. This informs the 3D printer to deposit the material within both the block and the sphere comprising the shape, which results in a printed part comprising a single (one) material. For the surface sphere, the normal direction is placed inwards and the 3D printer extrudes support material from that area.

The systems and methods of the above embodiments may be used to develop security elements to protect object and/or product designs. For example, in the case where a series of spheres are embedded in the 3D model, the model will print out as a composite of two printing materials. Either the use of support material or the use of another feed material in a dual head extrusion printer can provide such structure. In order for the 3D printer to recognize the different materials, multiple solid bodies are included and identified in the model. The printing software can recognize the solid bodies, and the user can specify different materials for each respective body. Advantageously, only a trusted party (e.g., the creator) will know how to manipulate the CAD model so that the spheres will be printed using material different from the model material such that a composite model is produced. Those who misappropriate the models will fail to print the expected elements. When a printer receives the model specification, if all the spheres inside the model are surface bodies, the printer will be laying support material for all spheres. An example support material may be acrylic copolymer. It is mostly water soluble and easy to break, resulting in a more fragile and less stable structure.

Figure 28B:
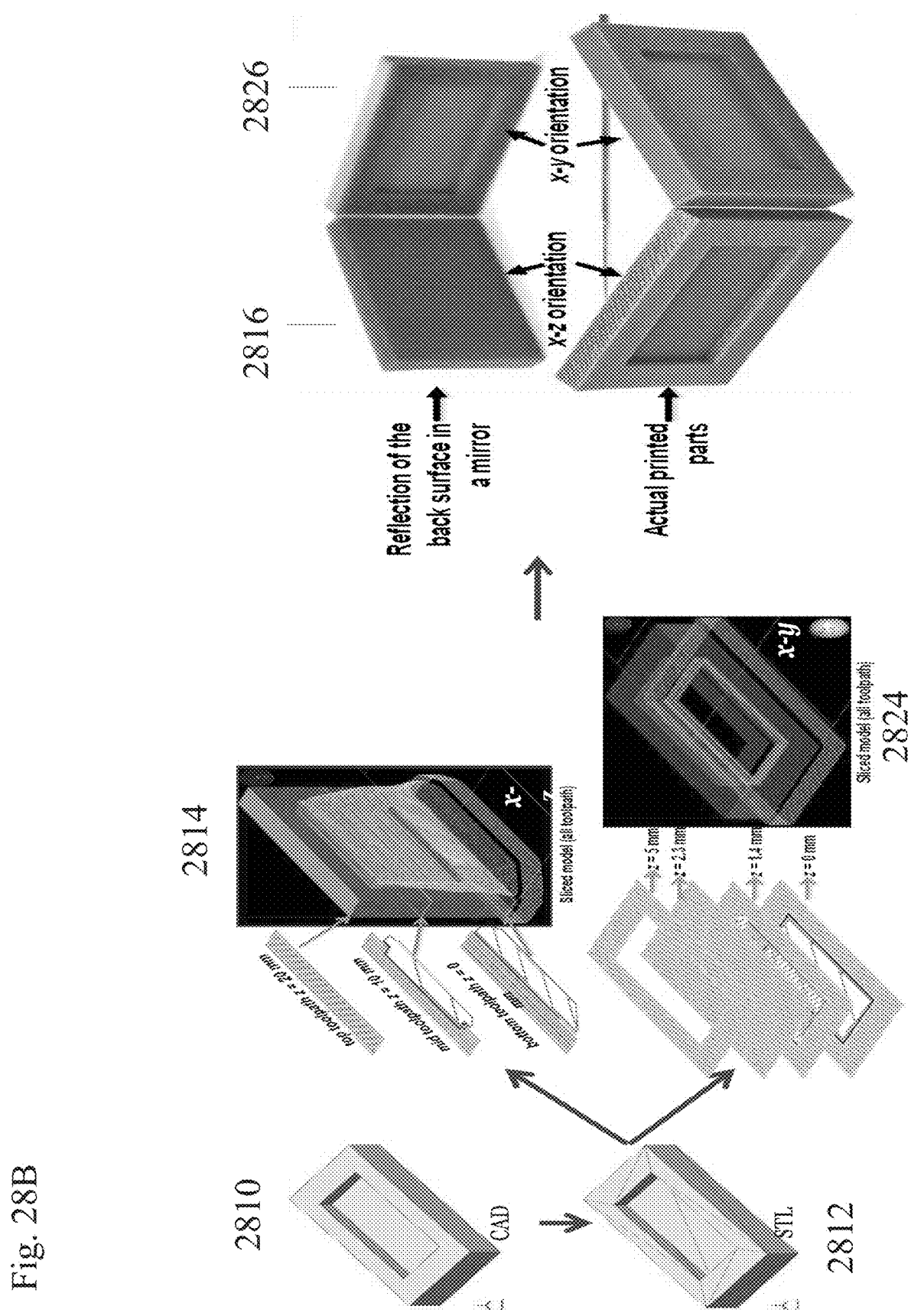

While the example embodiments discussed herein use embedded spheres as security elements, one of ordinary skill in the art will appreciate that other shapes may be used, including, for example, cylinder of circular, square, or oval cross section, pyramid, rectangular box, torus, etc. For instance, FIG. 28B shows the specimens 3D-printed having a rectangular split element. With the addition of these security elements, the CAD 3D model is printed differently under different orientations. Under one orientation, the part is printed as designed, while under another orientation, the part is printed with defects and lower quality. As shown, the CAD 3D model 2810, which incorporates the rectangular cutout, is converted to an STL file 2812, which is subsequently printed in the x-z orientation 2814 and in the x-y orientation 2824. As shown at 2816, when a CAD file containing security features is sliced and printed in the x-z orientation, the back side of the shape is solid. When the same file is printed in x-y orientation (as shown at 2826), the back side also has a rectangular sink, leaving only a thin layer of material. The defective surface cause unexpected early failure for parts that, for example, have a lower surface for load bearing.

The embodiment of FIG. 28B shows only two orientations, but, in various other embodiments, security elements can be further tuned to be orientation-specific and/or angle-specific, such as only a specific combination can print as high-quality parts. Advantageously, extensive efforts are needed from unauthorized users to exhaust all possible processing parameter combinations.

According to various embodiments, the security elementscan be orientation-specific, such that all the processing such as orientation, angle, temperature, etc. can be saved separately as keys to the design files. Only authorized users will have access to both the design files and the keys to know how to process the files.

Figure 29A:
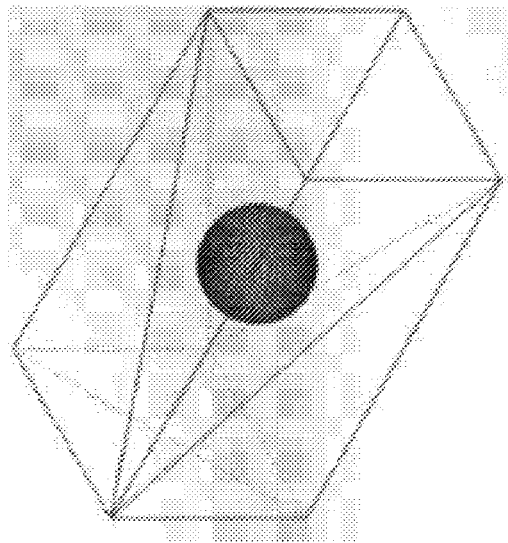
FIGS. 29A and 29B show a surface geometry model and a specimen 3D-printed cross section, respectively, of a 3D model with an embedded solid sphere.
Figure 29B:
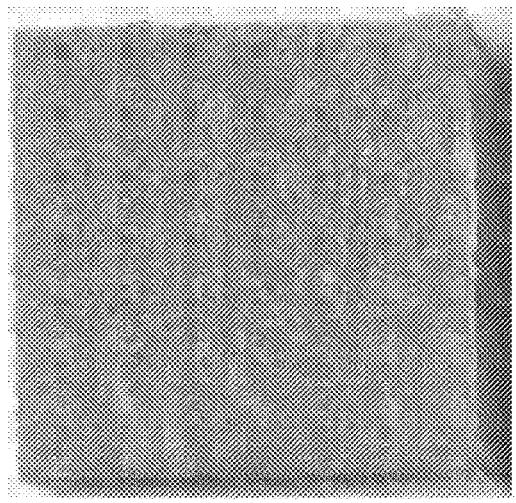
Figure 30B:
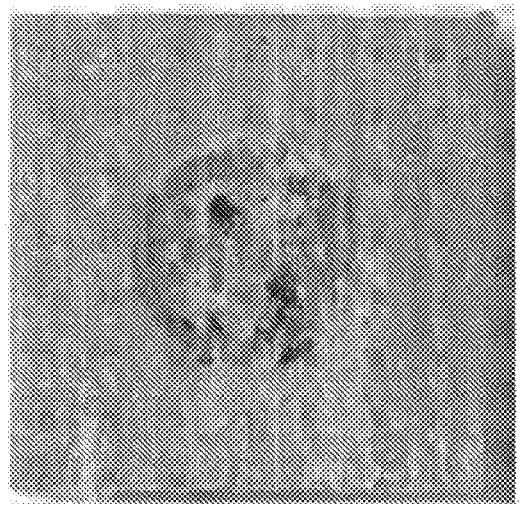

FIGS. 29A and 29B show a surface geometry model and a specimen 3D-printed cross section, respectively, of a 3D model with an embedded solid sphere. FIGS. 30A and 30B show a surface geometry model and a specimen 3D-printed cross section, respectively, of another, different 3D model with an embedded surface sphere. FIGS. 29A and 30A show two CAD drawings of embedded solid sphere rectangle and embedded surface sphere rectangle, respectively, which appear to have the same geometric representation to users in SolidWorks™. However, the model with the embedded solid sphere prints as a solid block in FIG. 29B, while model with embedded surface sphere is filled with support material at the center, as shown in FIG. 30B.

Figure 31:
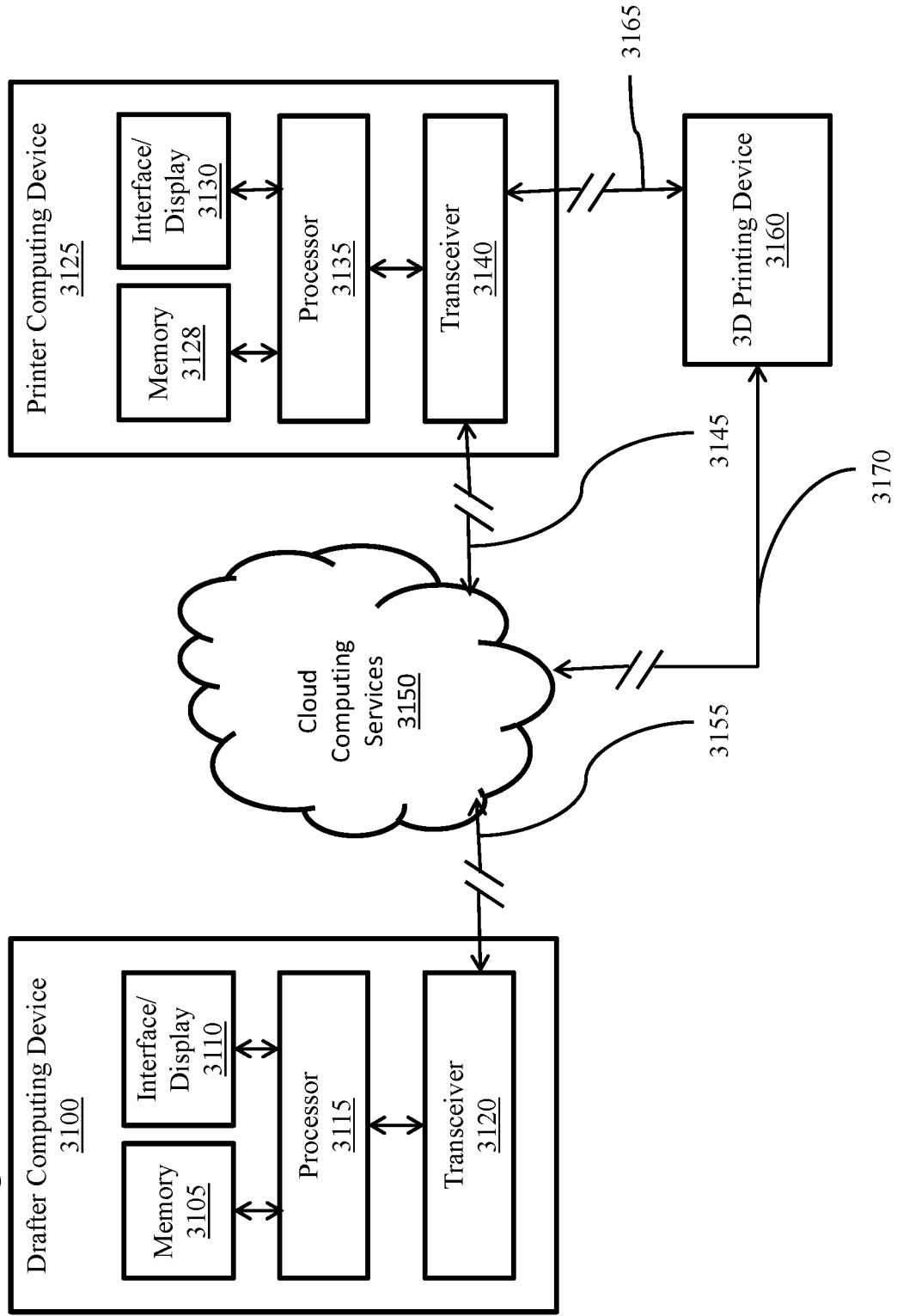
FIG. 31 shows an example of computing devices that may be configured to practice the methods and systems disclosed herein.

FIG. 31 shows example computing devices that may be utilized to practice the methods and systems disclosed herein. FIG. 31 includes a drafter computing device 3100 that includes a memory 3105 coupled to a processor 3115. The processor 3115 is coupled to an interface/display 3110 and a transceiver 3120. The drafter computing device can, for example, be used to create and/or modify 3D models, including saving/converting models into different model formats (e.g., CAD to STL as disclosed herein) and importing models into a CAD software (e.g., opening an STL file with Solidworks™).

The transceiver 3120 can be connected by a connection 3155 to cloud computing services 3150. While the term "cloud computing services" is used in relation to the example embodiment, it should be understood that in some embodiments the cloud computing services 3150 is not a distributed environment. The cloud computing services 3150 may be connected to a printer computing device 3125 through a connection 3145 and to a 3D printing device 3160 through a connection 3170. The connections 3155, 3145, and 3170 may be through a network, wireless, wired, the internet, etc., and/or any combination thereof.

The printer computing device 3125 includes a memory 3128 coupled to a processor 3135. The processor 3135 is also coupled to an interface/display 3130 and a transceiver 3140. The printer computing device 3125 can communicate through the transceiver with the 3D printing device 3160, the cloud computing services 3150, and subsequently the drafter computing device 3100.

In one example embodiment, the printer computing device 3125 may be used to modify images designed at the drafter computing device 3100 and saved in the cloud computing services 3150. The printer computing device 3125 can therefore be used to prepare an object for 3D printing, and then send the object to the 3D printing device 3160 for printing. The 3D printing device 3160 may receive information on how to configure itself for printing from the printer computing device 3125, the cloud computing services 3150, and/or the drafter computing device 3100. In this way, according to various embodiments, any of the security elements that cause a print job to be configured in a certain way as disclosed herein can be implemented during printing. Furthermore, this system can allow certain configuration and security information to be stored on one, some, or all of the types of devices and services shown in FIG. 31, so as to better protect the secrets associated with how a particular 3D model is configured with embedded security elements.

FIG. 31 shows just one possible combination of devices that may be used according to the systems and methods disclosed herein. More or fewer devices than those shown may be used, and some of the devices shown in FIG. 31 may be combined in a single device. Cloud computing services may not be used in some embodiments. In some embodiments the drafter computing device 3100 and the printer computing device 3125 may directly communicate with each other.

Figure 32:
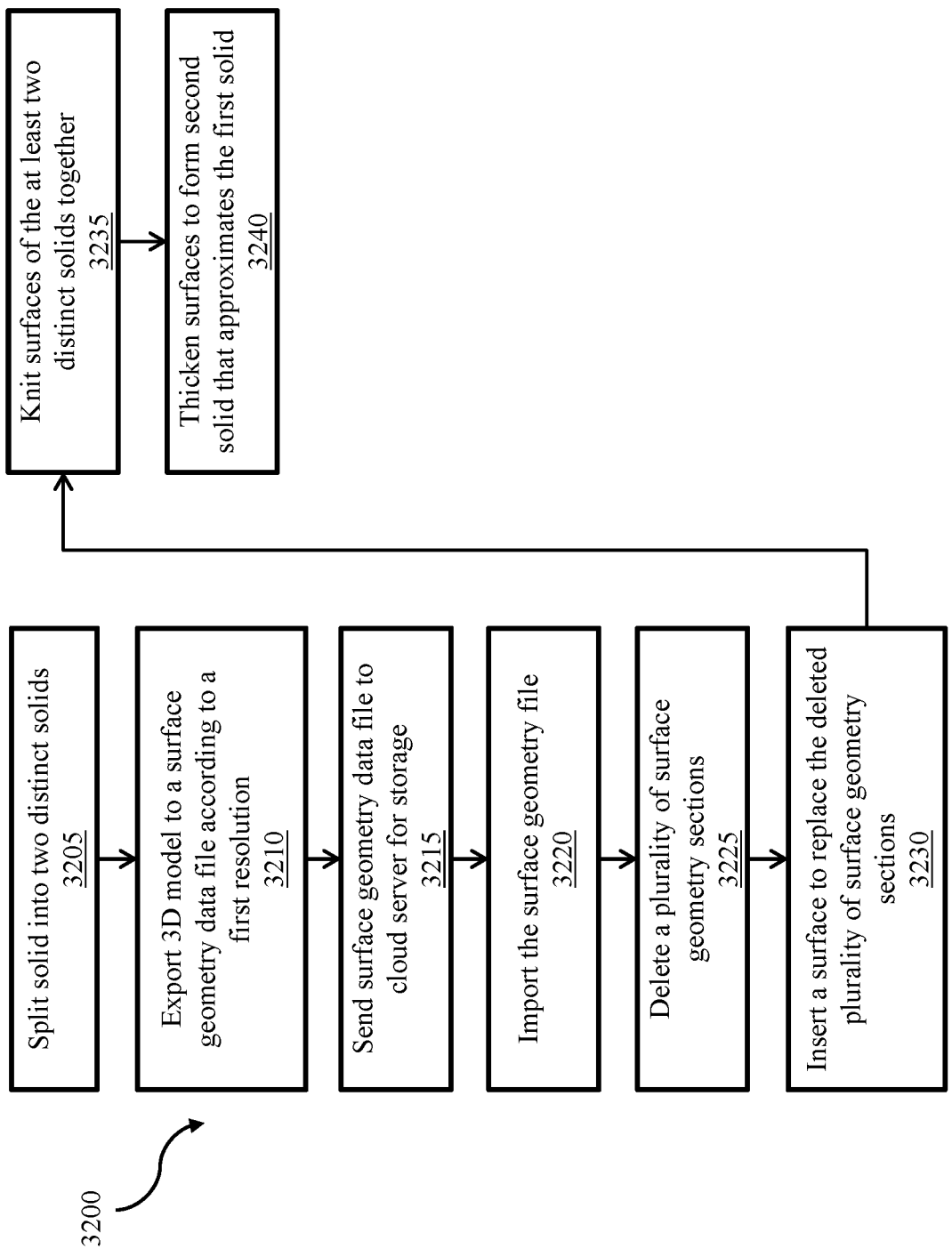
FIG. 32 is a schematic flow diagram of a method for embedding a security element into a 3D model.

FIG. 32 is a schematic flow diagram of a method 3200 for embedding a security element into a 3D model. In an operation 3205, a first solid of a three-dimensional (3D) model is split into at least two parts, such that the 3D model represents at least two distinct solids. The first solid can be split many more times to yield additional distinct solids in various embodiments. The split may be according to a plane, a curved surface, a line or spline extended through the first solid, or any other method of splitting the first solid. In an operation 3210, the 3D model is converted to a digital surface geometry schema according to a first resolution. For example, as disclosed herein, the digital surface geometry schema may be an STL file. The digital surface geometry schema describes surface geometry of the at least two distinct solids as discussed herein throughout.

In an operation 3215, the digital surface geometry schema is sent to a cloud server device for storage. In an operation 3220, the digital surface geometry schema is imported for preparation to print the first solid represented in the model. In the example embodiment of FIG. 32, the digital surface geometry schema is an STL data file. In an operation 3225, after importing the digital surface geometry schema, a plurality of surface geometry sections that are in the same plane are deleted. In an operation 3230, before knitting the surfaces of the at least two distinct solids together, a planar surface to replace the deleted plurality of surface geometry sections is inserted where the deleted sections were previously located. In this way, gaps formed by surface geometry sections (e.g., when the split is a spline split) are removed.

In an operation 3235, the surfaces of the at least two distinct solids are knitted together. In an operation 3240, the knitted surfaces are thickened to form a second solid that approximates the first solid prior to the first solid being split into at least two parts.

Figure 33:
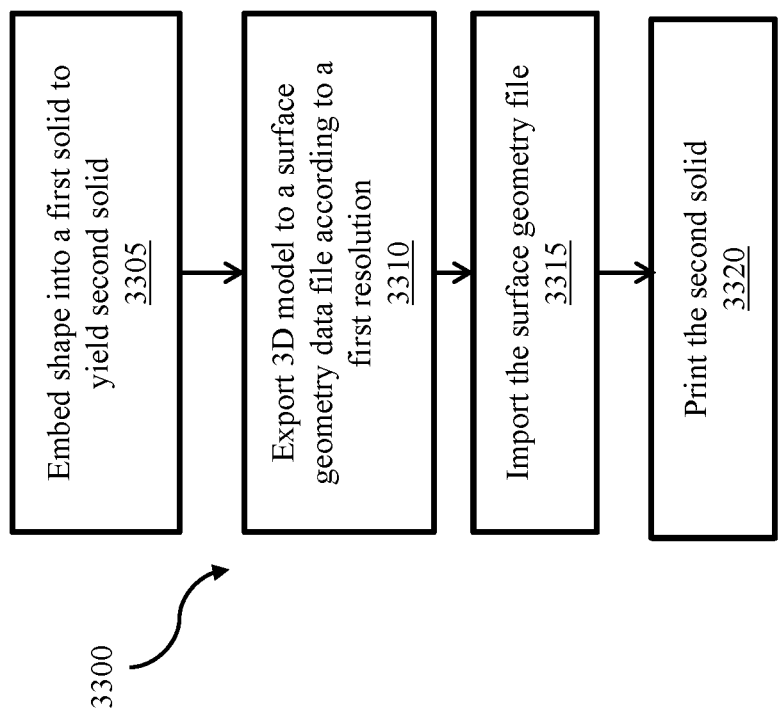
FIG. 33 is a schematic flow diagram of another method for embedding a security element into a 3D model.

FIG. 33 is a schematic flow diagram of another method 3300 for embedding a security element into a 3D model. In an operation 3305, a shape is embedded into a first solid of a three-dimensional (3D) model to yield a second solid. The shape is a solid shape or a surface element. In an operation 3310, the 3D model of the second solid is converted to a digital surface geometry schema according to a first resolution. The digital surface geometry schema describes surface geometry of the second solid including the embedded shape.

In an operation 3315, the digital surface geometry schema is imported for editing. In an operation 3320, the second solid is printed. In some embodiments as described herein, the embedded shape is intentionally not apparent in any cross section of the printed second solid. In other embodiments as described herein, the embedded shape is apparent in a cross section of the printed second solid. Whether the shape shows up can be dependent on the properties of the shape itself (e.g., solid, surface) and the settings of the print job (e.g., whether secondary materials are specified).

Figure 34:
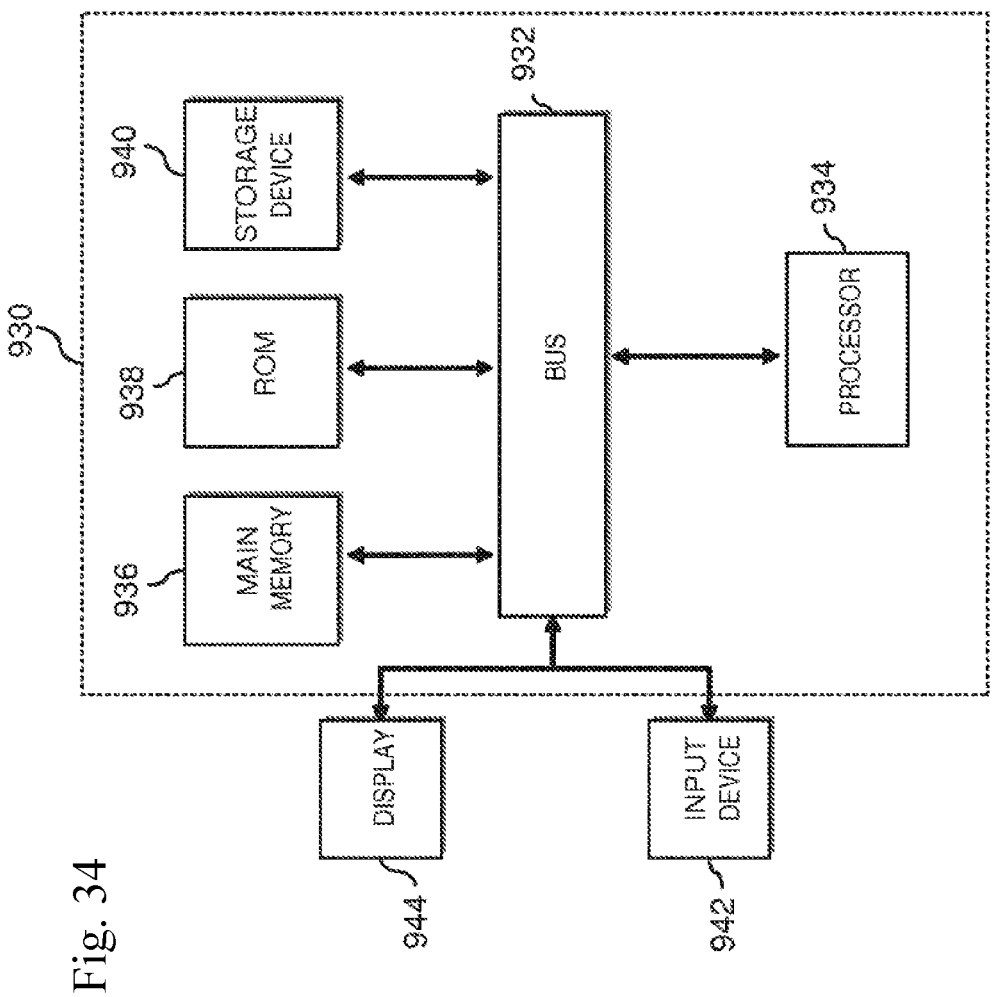
FIG. 34 illustrates a computer system for use with certain implementations.

FIG. 34 illustrates a computer system for use with certain implementations. Any of the methods defined herein can be executed on a stored on a computer readable medium and executed by a computing device specifically programmed to execute the instructions stored on the computer readable medium. In particular, FIG. 34 is a block diagram of a computing device 930 in accordance with an illustrative implementation. The computing device 930 includes a bus 932 or other communication component for communicating information and a processor 934 or processing circuit coupled to the bus 932 for processing information. The computing device 930 can also include one or more processors 934 or processing circuits coupled to the bus 932 for processing information. The computing device 930 also includes a main memory 936, such as a random access memory (RAM) or other dynamic storage device, coupled to the bus 932 for storing information, and instructions to be executed by the processor 934. Main memory 936 can also be used for storing position information, temporary variables, or other intermediate information during execution of instructions by the processor 934. The computing device 930 may further include a read only memory (ROM) 938 or other static storage device coupled to the bus 932 for storing static information and instructions for the processor 934. A storage device 940, such as a solid-state device, magnetic disk or optical disk, is coupled to the bus 932 for persistently storing information and instructions.

The computing device 930 may be coupled via the bus 932 to a display 944, such as a liquid crystal display, or active matrix display, for displaying information to a user. An input device 942, such as a keyboard including alphanumeric and other keys, may be coupled to the bus 932 for communicating information and command selections to the processor 934. In another implementation, the input device 942 has a touch screen display 944. The input device 942 can include a cursor control, such as a mouse, a trackball, or cursor direction keys, for communicating direction information and command selections to the processor 934 and for controlling cursor movement on the display 944.

According to various implementations, the processes and methods described herein can be implemented by the computing device 930 in response to the processor 934 executing an arrangement of instructions contained in main memory 936. Such instructions can be read into main memory 936 from another non-transitory computer-readable medium, such as the storage device 940. Execution of the arrangement of instructions contained in main memory 936 causes the computing device 930 to perform the illustrative processes described herein. One or more processors in a multi-processing arrangement may also be employed to execute the instructions contained in main memory 936. In alternative implementations, hard-wired circuitry may be used in place of or in combination with software instructions to effect illustrative implementations. Thus, implementations are not limited to any specific combination of hardware circuitry and software.

Although an example computing device has been described in FIG. 34, implementations described in this specification can be implemented in other types of digital electronic circuitry, or in computer software, firmware, or hardware, including the structures disclosed in this specification and their structural equivalents, or in combinations of one or more of them.

Implementations described in this specification can be implemented in digital electronic circuitry, or in computer software, firmware, or hardware, including the structures disclosed in this specification and their structural equivalents, or in combinations of one or more of them. The implementations described in this specification can be implemented as one or more computer programs, i.e., one or more modules of computer program instructions, encoded on one or more computer storage media for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium is both tangible and non-transitory.

The operations described in this specification can be performed by a data processing apparatus on data stored on one or more computer-readable storage devices or received from other sources. The term "data processing apparatus" or "computing device" encompasses all kinds of apparatus, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

As used herein, the singular forms "a", "an" and "the" include plural referents unless the context clearly dictates otherwise. Thus, for example, the term "a member" is intended to mean a single member or a combination of members, "a material" is intended to mean one or more materials, or a combination thereof.

As used herein, the terms "about" and "approximately" generally mean plus or minus 10% of the stated value. For example, about 0.5 would include 0.45 and 0.55, about 10 would include 9 to 11, about 1000 would include 900 to 1100.

It should be noted that the terms "example" or "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Other substitutions, modifications, changes and omissions may also be made in the design, operating conditions and arrangement of the various exemplary embodiments without departing from the scope of the present invention.

While this specification contains many specific implementation details, these should not be construed as limitations on the scope of any embodiments or of what may be claimed, but rather as descriptions of elements specific to particular implementations of particular embodiments. Certain elements described in this specification in the context of separate implementations can also be implemented in combination in a single implementation. Conversely, various elements described in the context of a single implementation can also be implemented in multiple implementations separately or in any suitable subcombination. Moreover, although elements may be described above as acting in certain combinations and even initially claimed as such, one or more elements from a claimed combination can in some cases be excised from the combination, and the claimed combination may be directed to a subcombination or variation of a subcombination.

What is claimed is:

1. A method comprising:
digitally splitting a first solid of a three-dimensional (3D) model into at least two parts, such that the 3D model comprises at least two distinct solids;
digitally displacing at least one of the at least two distinct solids from starting coordinates and according to predetermined displacement coordinates in a coordinate system of the 3D model, comprising:
spatially separating the at least two distinct solids according to the predetermined displacement coordinates; and
generating a gap between the at least two distinct solids, the gap defined by the predetermined displacement coordinates; and
converting the 3D model to a digital surface geometry schema according to a first resolution, wherein the digital surface geometry schema describes surface geometry of the at least two distinct solids digitally displaced according to the predetermined coordinates, wherein the digital surface geometry schema comprises the gap such that the starting coordinates are not determinable based on the digital surface geometry schema.

2. The method of claim 1, wherein the digital surface geometry schema is a stereolithography (STL) model type.

3. The method of claim 1, wherein the digital surface geometry schema comprises at least one triangulated surface.

4. The method of claim 1, further comprising submitting the digital surface geometry schema to a cloud server device for storage.

5. The method of claim 1, wherein the splitting of the first solid is along a straight plane.

6. The method of claim 1, wherein the splitting of the first solid is along a curved plane.

7. The method of claim 1, further comprising selecting a location and a shape of the splitting of the first solid based at least in part on a parameter selected from the group consisting of: the first resolution, a 3D printer type, an anticipated horizontal print direction, an anticipated vertical print direction, an anticipated slicer software scheme, an anticipated slice thickness, and an anticipated slice location.

8. The method of claim 1, further comprising selecting the first resolution from a plurality of available resolutions based at least in part on a parameter selected from the group consisting of: a shape of the split of the first solid, a location of the split of the first solid, a 3D printer type, an anticipated horizontal print direction, an anticipated vertical print direction, an anticipated slicer software scheme, an anticipated slice thickness, and an anticipated slice location.

9. The method of claim 1, further comprising:
importing the digital surface geometry schema; and
knitting surfaces of the at least two distinct solids together to form a second solid that approximates the first solid prior to the first solid being split into at least two parts.

10. The method of claim 9, wherein, after knitting the surfaces of the at least two distinct solids together, the gap is eliminated.

11. The method of claim 9, wherein, after knitting the surfaces of the at least two distinct solids together, the gap in the surfaces corresponding to at least part of where the first solid was split remains in the digital surface geometry schema at least in part.

12. The method of claim 11, further comprising specifying a 3D printer for printing and the printing conditions of the second solid such that the at least one gap does not substantially affect the quality of the printing of the second solid.

13. The method of claim 9, further comprising:
deleting, after importing the digital surface geometry schema, a plurality of surface geometry sections that are in the same plane; and
inserting, before knitting the surfaces of the at least two distinct solids together, a planar surface to replace the deleted plurality of surface geometry sections.

14. The method of claim 9, further comprising displacing the two parts after splitting the first solid.

15. The method of claim 14, further comprising moving, after importing the digital surface geometry schema and before knitting the surfaces of the at least two distinct solids together, the two parts to remove the gap.

16. The method of claim 14, wherein the gap is located where the first solid was split.

17. The method of claim 1, further comprising:
embedding a shape in a first solid of the 3D model to yield a third solid, wherein the first solid is one of the at least two distinct solids.

18. The method of claim 17, further comprising printing the third solid.

19. The method of claim 17, wherein the embedded shape represents a security element embedded into the 3D model.

* * * * *